(12) United States Patent
Edler

(10) Patent No.: US 9,488,265 B2
(45) Date of Patent: Nov. 8, 2016

(54) COMPACT PLANETARY DIFFERENTIAL GEAR SET ARRANGEMENT

(75) Inventor: Andrew N. Edler, Homer, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/342,900

(22) PCT Filed: Sep. 4, 2012

(86) PCT No.: PCT/US2012/053672
§ 371 (c)(1),
(2), (4) Date: Jun. 11, 2014

(87) PCT Pub. No.: WO2013/036483
PCT Pub. Date: Mar. 14, 2013

(65) Prior Publication Data
US 2014/0315677 A1 Oct. 23, 2014

Related U.S. Application Data

(60) Provisional application No. 61/531,611, filed on Sep. 6, 2011, provisional application No. 61/673,439, filed on Jul. 19, 2012.

(51) Int. Cl.
*F16H 48/10* (2012.01)
*F16H 48/11* (2012.01)
(Continued)

(52) U.S. Cl.
CPC ........... *F16H 48/11* (2013.01); *B23K 15/0046* (2013.01); *F16H 48/40* (2013.01); *F16H 48/10* (2013.01); *F16H 2048/106* (2013.01); *F16H 2048/382* (2013.01); *Y10T 29/49464* (2015.01)

(58) Field of Classification Search
CPC .......................... F16H 2048/106; F16H 48/11

USPC .......................................................... 475/248
See application file for complete search history.

(56) References Cited

U.S. PATENT DOCUMENTS 3,433,922 A * 3/1969 McNabb .................. 219/121.13
4,838,123 A   6/1989 Matoba
(Continued)

FOREIGN PATENT DOCUMENTS

CN          101395407 A       3/2009
DE   10 2004 015 278 A1      10/2005
(Continued)

OTHER PUBLICATIONS

International Search Report for corresponding International Patent Application PCT/US2012/053672 mailed Feb. 7, 2013.
(Continued)

*Primary Examiner* — Ramya Burgess
*Assistant Examiner* — David Morris
(74) *Attorney, Agent, or Firm* — Merchant & Gould P.C.

(57) ABSTRACT

A compact planetary differential gear set includes first (130A) and second (130B) sun gears, a first set (200A) and a second set (200B) of planet gears (220), and a carrier (160) with a ring gear (190). Enmeshing gear pairs (210) are formed from one planet gear from each set. The first and second planet gear sets enmesh the first and second sun gears, respectively. The ring gear does not extend into an annular region containing the planet gears thereby allowing four or more gear pairs to compactly fit into the annular region. The carrier is a weldment and substantially encloses the sun gears and the planet gears permanently. The differential requires no fasteners or post-weld machining and may have a higher capacity, lower cost, smaller size, lower part number count, and/or lower amounts of material compared with conventional differentials. The differential is suited for motor vehicle applications.

42 Claims, 15 Drawing Sheets

(51) Int. Cl.
  *B23K 15/00* (2006.01)
  *F16H 48/40* (2012.01)
  *F16H 48/38* (2012.01)

(56) References Cited

U.S. PATENT DOCUMENTS

| | | | |
|---|---|---|---|
| 5,239,721 A * | 8/1993 | Zahuranec | 15/41.1 |
| 5,433,673 A * | 7/1995 | Cilano | 475/252 |
| 6,422,971 B1 * | 7/2002 | Katou et al. | 475/331 |
| D479,543 S | 9/2003 | Lannoch | |
| 7,819,771 B2 | 10/2010 | Nett et al. | |
| 8,221,278 B2 | 7/2012 | Biermann et al. | |
| 8,286,524 B2 | 10/2012 | Tang | |
| 8,327,541 B2 | 12/2012 | Harrup et al. | |
| D720,377 S | 12/2014 | Edler | |
| 2006/0160652 A1* | 7/2006 | Maki et al. | 475/248 |
| 2009/0084223 A1 | 4/2009 | Harrup et al. | |
| 2009/0291798 A1* | 11/2009 | Fujii et al. | 475/220 |
| 2009/0305834 A1 | 12/2009 | Fujii et al. | |
| 2010/0167862 A1 | 7/2010 | Hoehn | |
| 2011/0009233 A1* | 1/2011 | Mizuno et al. | 475/331 |
| 2011/0245012 A1 | 10/2011 | Biermann et al. | |
| 2013/0102432 A1 | 4/2013 | Imai et al. | |
| 2013/0116082 A1 | 5/2013 | Hagedorn | |
| 2013/0310213 A1 | 11/2013 | Matsuoka et al. | |
| 2014/0024489 A1 | 1/2014 | Heber et al. | |
| 2014/0031165 A1 | 1/2014 | Kubota et al. | |

FOREIGN PATENT DOCUMENTS

| | | |
|---|---|---|
| DE | 10 2006 019 131 A1 | 11/2007 |
| EP | 1 803 973 A1 | 7/2007 |
| GB | 1321 | 0/1782 |
| GB | 800230 | 8/1958 |
| KR | 2010-0084294 A | 7/2010 |
| WO | WO 92/12361 | 7/1992 |
| WO | WO 2009/054398 A1 | 4/2009 |

OTHER PUBLICATIONS

Höhn, B. et al. "Compact Final Drive for Vehicles with Front Wheel Drive and Transversely Mounted Engine", *AZT*, vol. 108, Jan. 2006, pp. 14-16 (English).

Höhn, B. et al. "Kompaktes Achsgetriebe fur Fahrzeuge mit Frontantrieb und quer eingebautem Motor", *ATZ*, vol. 108, Jan. 2006, pp. 46-51 (Same Article as above in German with Figures).

Hosokawa, R. et al. "Lightweight Differential", *SAE Technical Paper Series*. 2011-36-0105, Oct. 2011, pp. 1-8.

Understanding Gears, http://www.odts.de/southptr/gears/gears/htm, 5 pages (Copyright 2001, 2003, 2009).

Understanding Planetary Gears, http://www.odts.de/southptr/gears/planetary/htm, 2 pages (Copyright 2010).

Chinese Office Action for corresponding Chinese Patent Application No. 201210430469.X mailed Feb. 1, 2016 with English translation.

European Office Action for Application No. 12766224.5 mailed Jun. 3, 2016.

* cited by examiner

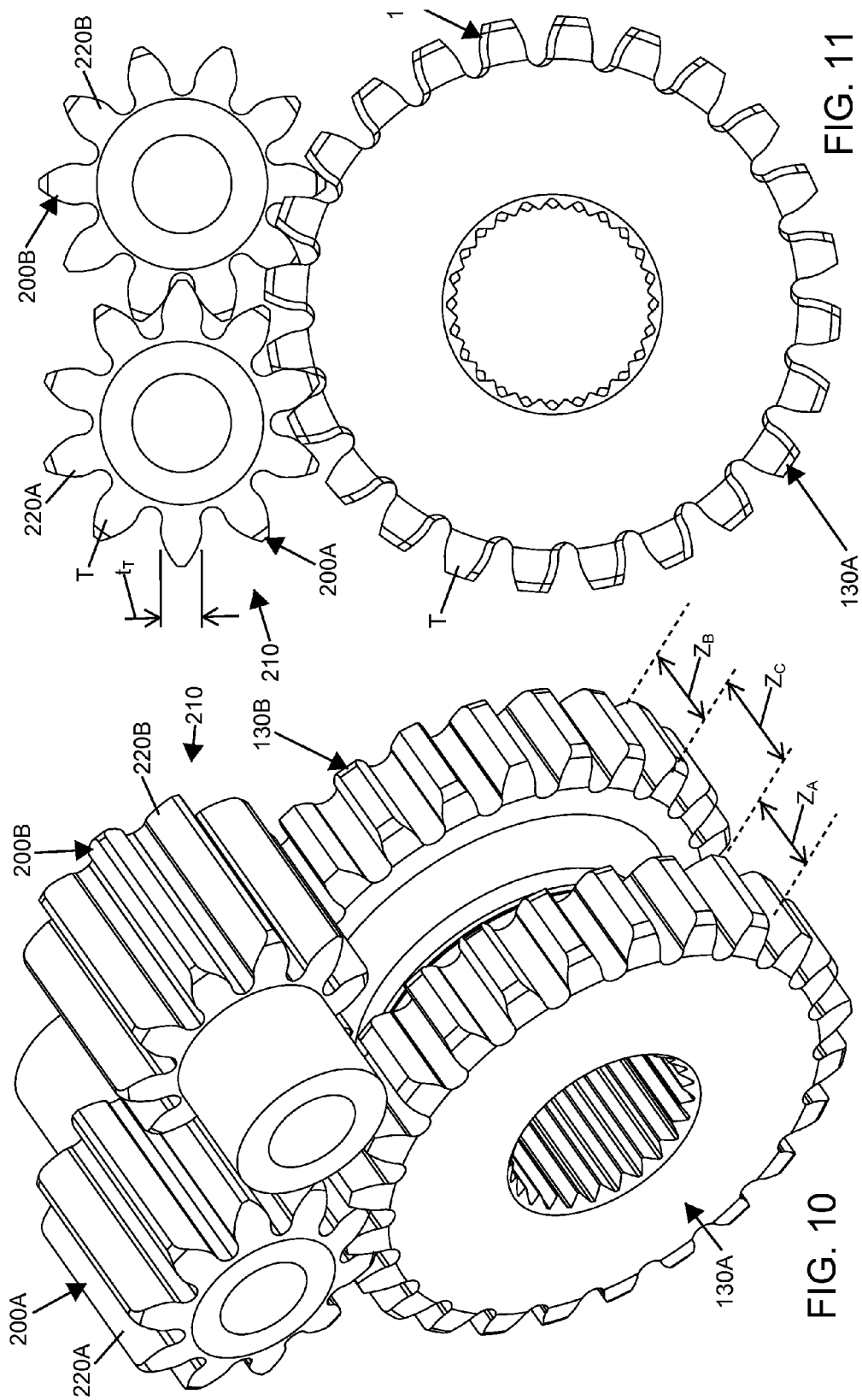

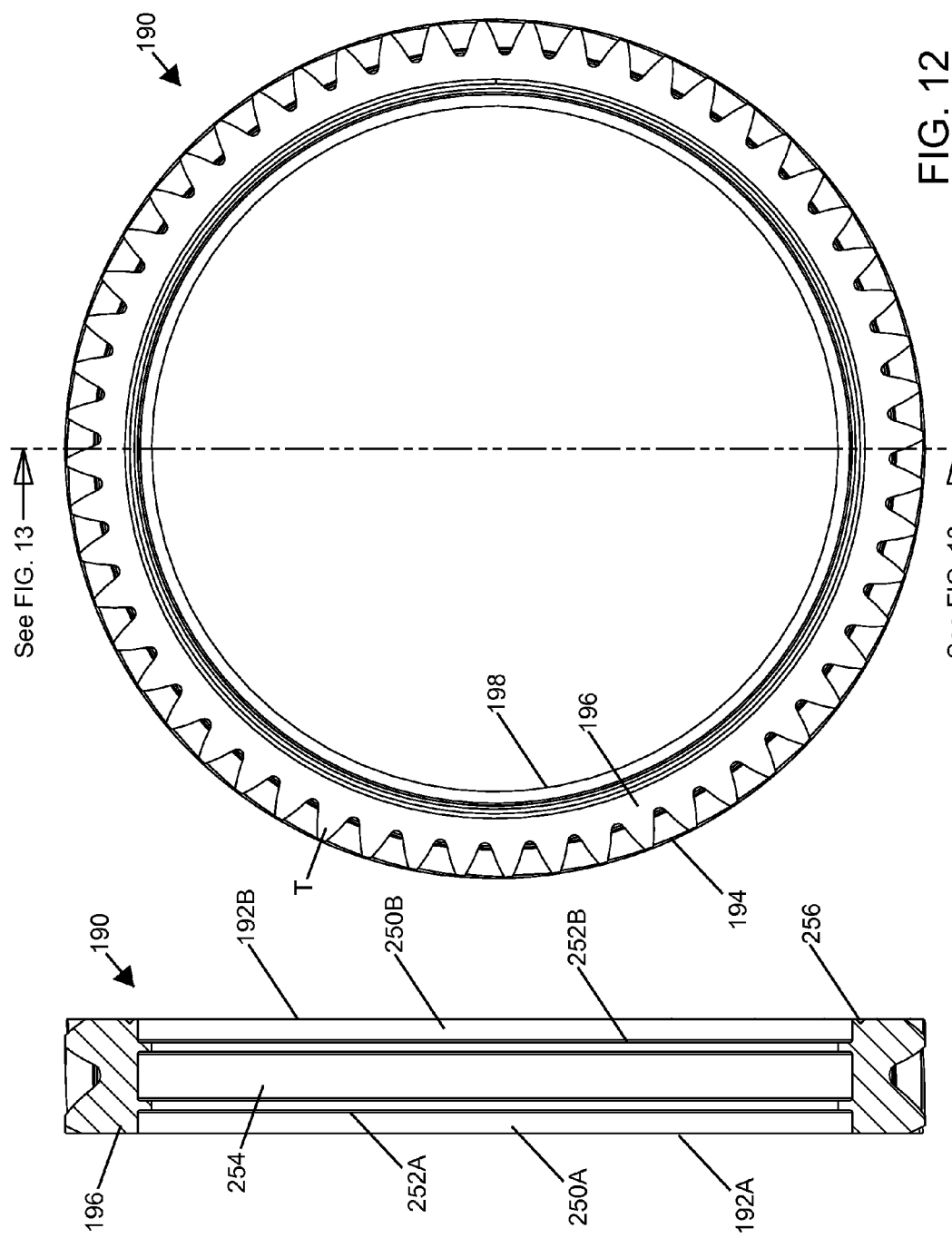

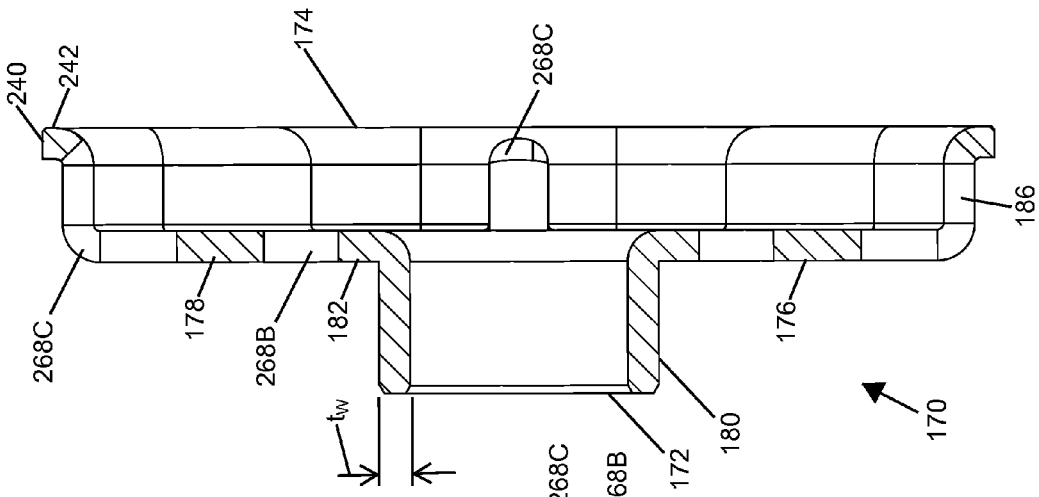
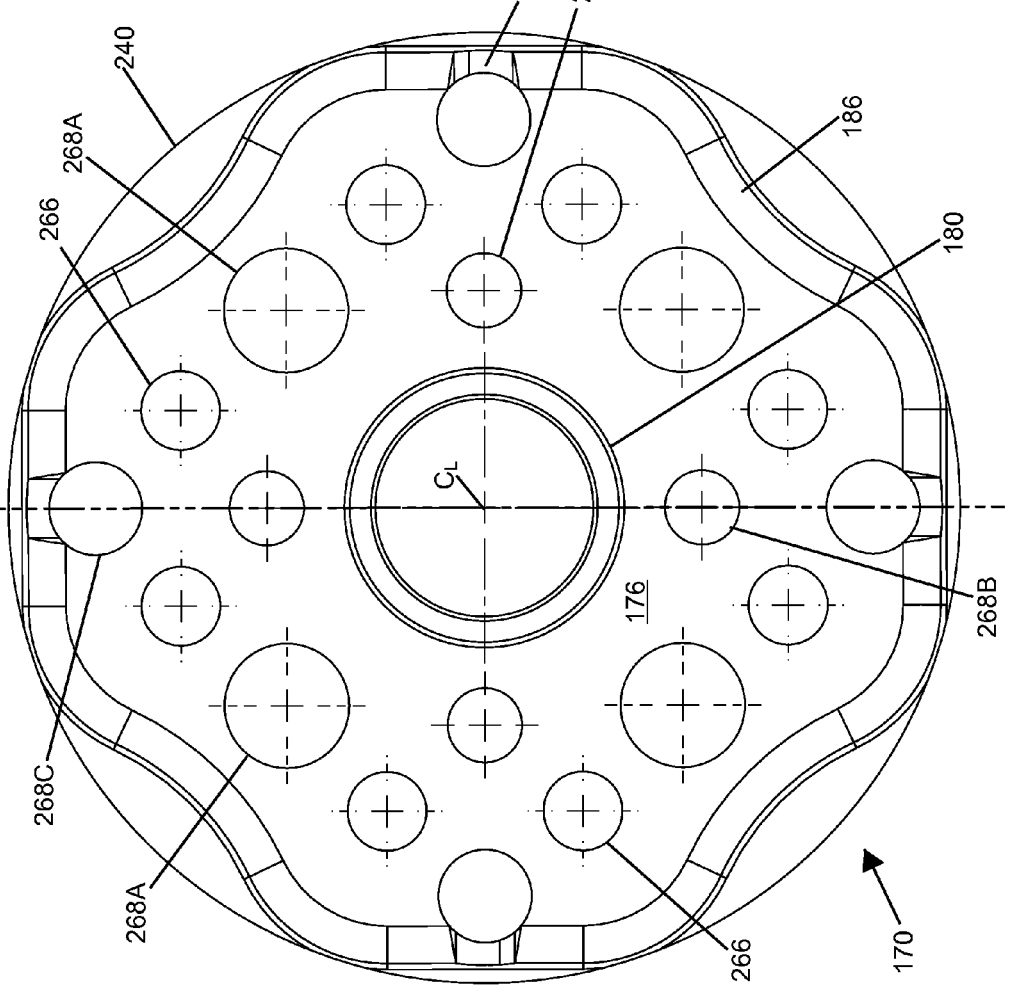

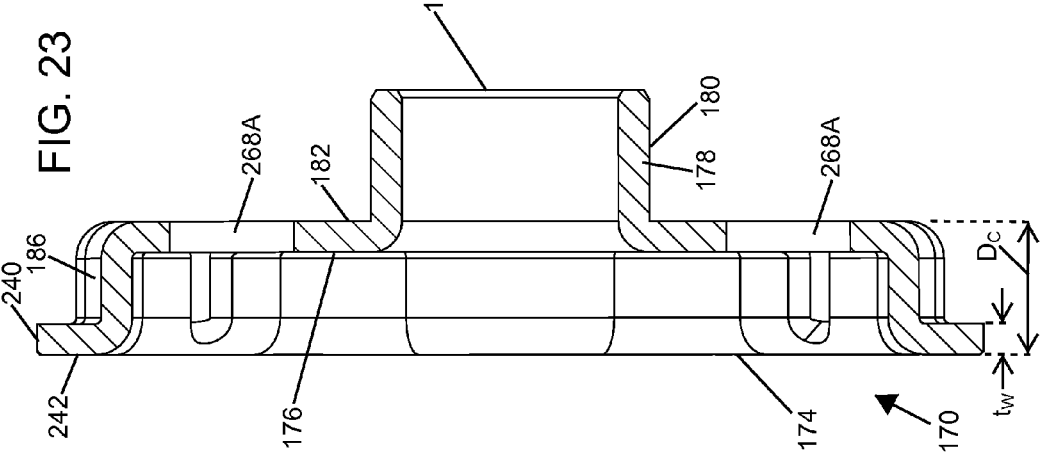
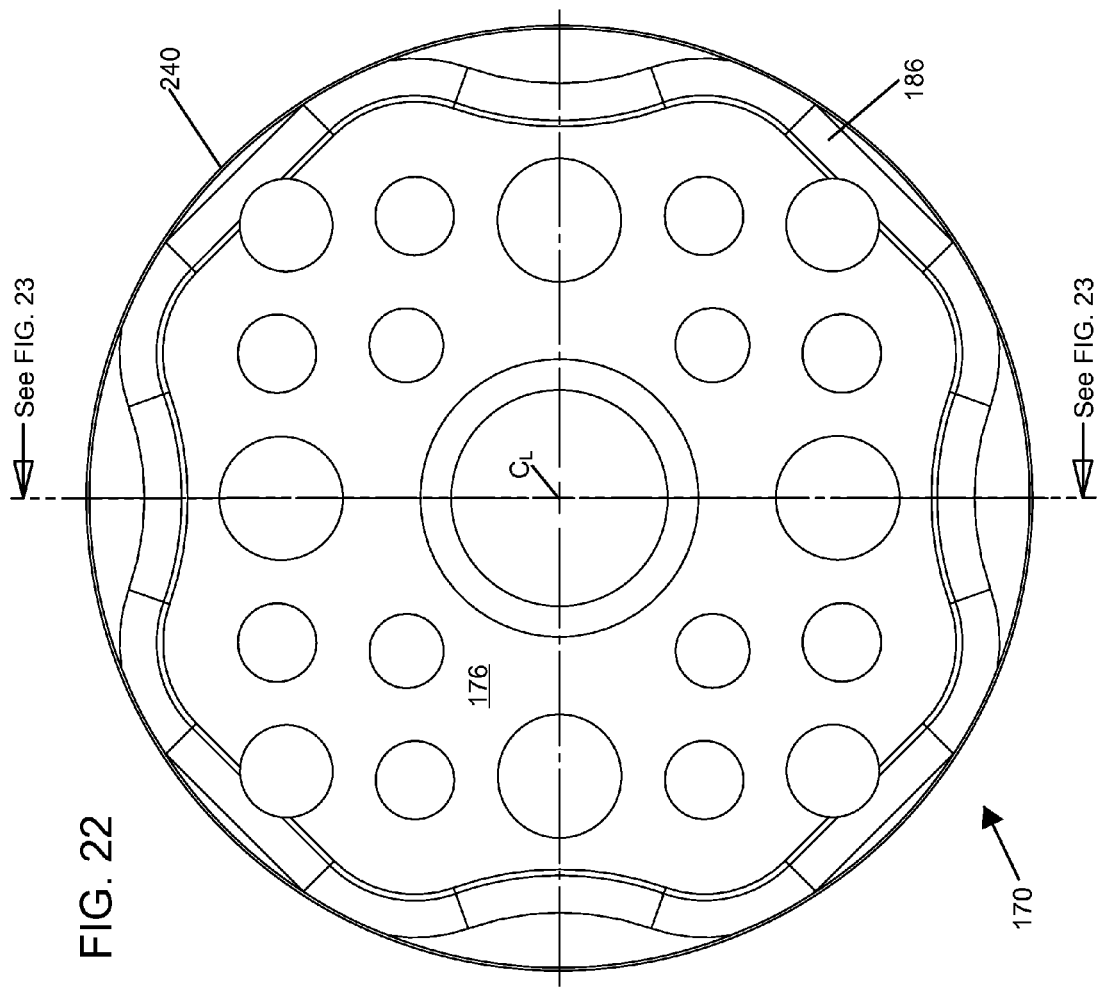

COMPACT PLANETARY DIFFERENTIAL GEAR SET ARRANGEMENT

CROSS-REFERENCE TO RELATED APPLICATIONS

This application is a National Stage Application of PCT/US2012/053672, filed 4 Sep. 2012, which claims benefit of U.S. patent application Ser. No. 61/531,611, filed 6 Sep. 2011, and U.S. patent application Ser. No. 61/673,439 filed on 19 Jul. 2012 and which applications are incorporated herein by reference. To the extent appropriate, a claim of priority is made to each of the above disclosed applications.

TECHNICAL FIELD

The present disclosure relates to differential gear sets and planetary differential gear sets. Such differential gear sets are typically found in wheel driven vehicles, such as automobiles and trucks.

BACKGROUND

Wheel driven vehicles typically are arranged with a pair of drive wheels positioned opposite each other adjacent opposite sides of the vehicle. The pair of drive wheels is typically driven by a common power source via a common drive train. The pair of drive wheels may be front wheels or rear wheels of the vehicle. When the vehicle is driven around a corner or along a curve, an outside drive wheel of the pair of drive wheels travels a longer distance than an inside drive wheel of the pair of drive wheels, which travels a shorter distance than the outside drive wheel. To accommodate the longer and the shorter distances simultaneously traveled by the opposite drive wheels, the common drive train typically includes a differential gear set.

In certain all-wheel-drive vehicles, all wheels of the vehicle are drive wheels powered by a common drive train. In certain vehicles, multiple pairs of drive wheel sets (e.g., dual wheels) are positioned opposite each other adjacent opposite sides of the vehicle. In such multi-wheel drive (e.g., multi-drive axle) vehicles, a drive train typically includes a differential gear set between each pair of drive wheels or drive wheel sets (e.g., a first pair of drive wheel sets and a second pair of drive wheel sets). As the first pair of drive wheel sets may have an average travel distance different from the second pair of drive wheel sets, a differential gear set may also be positioned between the first pair of drive wheel sets and the second pair of drive wheel sets (e.g., in a transfer case of the driveline).

Differential gear sets may be further used in other applications such as packaging machines, linkage arrangements, power dividers, etc.

Planetary gear sets may include one or more sun gears and one or more planet gears held in position by a carrier. The planet gears typically mesh with one or more of the sun gears. Certain planetary gear sets include a ring gear that is directly coupled to the carrier. Other planetary gear sets include a ring gear that meshes with the planet gears. Certain planetary gears sets may be arranged as differential gear sets. Certain planetary gear sets may be used in multi-speed transmissions.

Differential gear sets and/or planetary gear sets are often desired that are low in cost, are easily manufactured, include a low number of part numbers, are small in volume, are small in diameter, are narrow in width, are high in torque capacity, and/or are high in stiffness. The present disclosure satisfies these and other desires.

SUMMARY

One aspect of the present disclosure relates to a compact planetary differential gear set with a higher torque capacity in a given size than conventional planetary differential gear sets. The compact planetary differential gear set may have improved torque capacity in a given width, a given diameter, a given volume, a given mass, and/or a given rotational inertia in comparison to conventional differential designs.

Another aspect of the present disclosure relates to a planetary differential gear set with a lower cost for a given torque capacity than the conventional planetary differential gear sets. The lower cost may result from a low part number count, elimination of fasteners, automated assembly using fixtures, no post-weld machining, and/or a low amount of material used.

Still another aspect of the present disclosure relates to a planetary differential gear set including, a first sun gear, a second sun gear, a first set of planet gears, a second set of planet gears, and a carrier. The carrier substantially encloses the first sun gear, the second sun gear, the first set of planet gears, and the second set of planet gears. The planetary differential gear set requires no fasteners to operably position the first sun gear, the second sun gear, the first set of planet gears, the second set of planet gears, and the carrier relative to each other when the planetary differential gear set is in use.

In certain embodiments, such as vehicle axle applications, the first sun gear is adapted to drive a first axle of an automobile and the second sun gear is adapted to drive a second axle of the automobile. The first sun gear may be adapted to drive a first drive shaft of a vehicle and the second sun gear may be adapted to drive a second drive shaft of the vehicle in applications such as vehicle transfer cases. The first set of planet gears may enmesh the first sun gear and the second set of planet gears may enmesh the second sun gear. The first set of planet gears and the second set of planet gears may enmesh each other. The first set of planet gears and the second set of planet gears may be positioned about the sun gears at a common radius.

Yet another aspect of the present disclosure relates to a planetary differential gear set comprising a sun gear, a set of one or more planet gears, and a carrier having a welded construction that substantially encloses the sun gear and the set of planet gears such that the sun gear and the set of planet gears cannot be removed from the carrier. A method for assembling the planetary differential gear set may include: providing a first portion of the carrier; positioning the sun gear adjacent the first portion of the carrier; positioning the set of planet gears adjacent the first portion of the carrier; positioning a second portion of the carrier adjacent the first portion of the carrier; and, welding the first portion and the second portion of the carrier together.

In certain embodiments, the welding of the first portion and the second portion of the carrier together in the above method may include electron beam welding. The welding of the first portion and the second portion of the carrier together may introduce only minimal distortion and/or local weld distortion such that no post-weld machining of the planetary differential gear set is required. In certain embodiments, the planetary differential gear set further includes a ring gear. The carrier may include the ring gear, a first portion welded to the ring gear, and a second portion welded to the ring gear. A method for assembling the planetary differential gear set may include: providing the first portion of the carrier; positioning the sun gear adjacent the first portion of the carrier; positioning the set of planet gears adjacent the first portion of the carrier; positioning the ring gear of the carrier adjacent the first portion of the carrier; positioning the second portion of the carrier adjacent the ring gear of the carrier; and, welding the first portion and the second portion of the carrier to the ring gear of the carrier. The welding may include electron beam welding. The sun gear may be adapted to drive a drivetrain shaft (e.g., an axle, a drive shaft, etc.) of a vehicle.

Still another aspect of the present disclosure relates to a planetary differential gear set including a first sun gear, a second sun gear that is interchangeable with the first sun gear, a first set of planet gears enmeshed with the first sun gear, a second set of planet gears enmeshed with the second sun gear, and a carrier including a first piece and a second piece that are interchangeable with each other. The planet gears of the first set and the second set are interchangeable with each other. The planet gears of the first set and the second set are enmeshed with each other. The first piece forms a major portion of a first side of the carrier, and the second piece forms a major portion of a second side of the carrier. A ring gear may be welded to the first piece and the second piece of the carrier.

Yet another aspect of the present disclosure relates to a planetary differential gear set including a first sun gear, a second sun gear, at least four intermeshing planet gear pairs, and a carrier. Each of the intermeshing planet gear pairs includes a first planet gear enmeshed with the first sun gear and a second planet gear enmeshed with the second sun gear. The carrier includes a ring gear piece that defines an innermost surface. The innermost surface of the ring gear piece is positioned beyond an outermost cylinder occupied by the intermeshing planet gear pairs.

In certain embodiments, the innermost surface of the ring gear piece defines a radius that is spaced from the outermost cylinder occupied by the intermeshing planet gear pairs by a radial distance. The radial distance may be less than a thickness of a tooth of the planet gears. The carrier may include a first wall and a second wall that are spaced from each other. A first and a second planet gear of the intermeshing planet gear pairs may each substantially extend between the first wall and the second wall. The first and the second planet gears may each include a reduced diameter portion. The reduced diameter portion of the first planet gear may clear the second sun gear, and the reduced diameter portion of the second planet gear may clear the first sun gear.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 10 is a perspective view illustrating the pair of opposite enmeshed planet gears of FIG. 5 with a first of the planet gears also enmeshed with a first of the sun gears of FIG. 2 and a second of the planet gears also enmeshed with a second of the sun gears of FIG. 2;

FIG. 11 is a plan view illustrating the pair of opposite enmeshed planet gears of FIG. 5 with the first of the planet gears of FIG. 10 also enmeshed with the first of the sun gears of FIG. 10 and the second of the planet gears of FIG. 10 also enmeshed with the second of the sun gears of FIG. 10;

FIG. 12 is a plan view of the ring gear of FIG. 2;

FIG. 13 is a cross-sectional elevation view of the ring gear of FIG. 2 as called out at FIG. 12;

FIG. 18 is a plan view of one of the case halves of FIG. 2 showing an outside of the case half;

FIG. 19 is a cross-sectional side elevation view of the one of the case halves of FIG. 18 as called out at FIG. 18;

FIG. 22 is still another plan view of one of the case halves of FIG. 2 showing the inside of the case half; and FIG. 23 is a cross-sectional side elevation view of the one of the case halves of FIG. 22 as called out at FIG. 22.

DETAILED DESCRIPTION

Reference will now be made in detail to example embodiments of the present disclosure. The accompanying drawings illustrate examples of the present disclosure. When possible, the same reference numbers will be used throughout the drawings to refer to the same or like parts.

Figure 1:
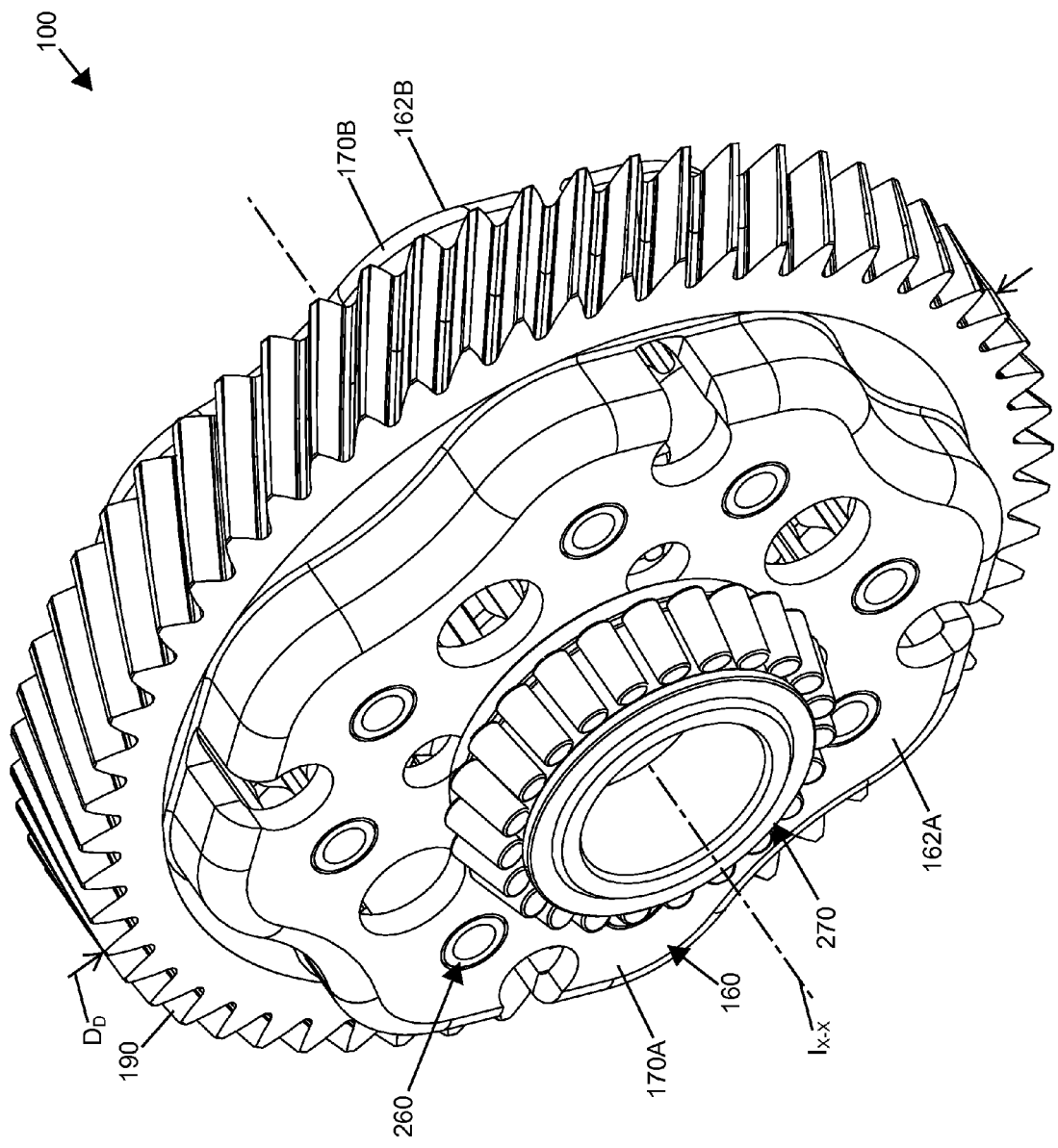
FIG. 1 is a perspective view of a planetary differential gear set arrangement according to the principles of the present disclosure.
Figure 2:
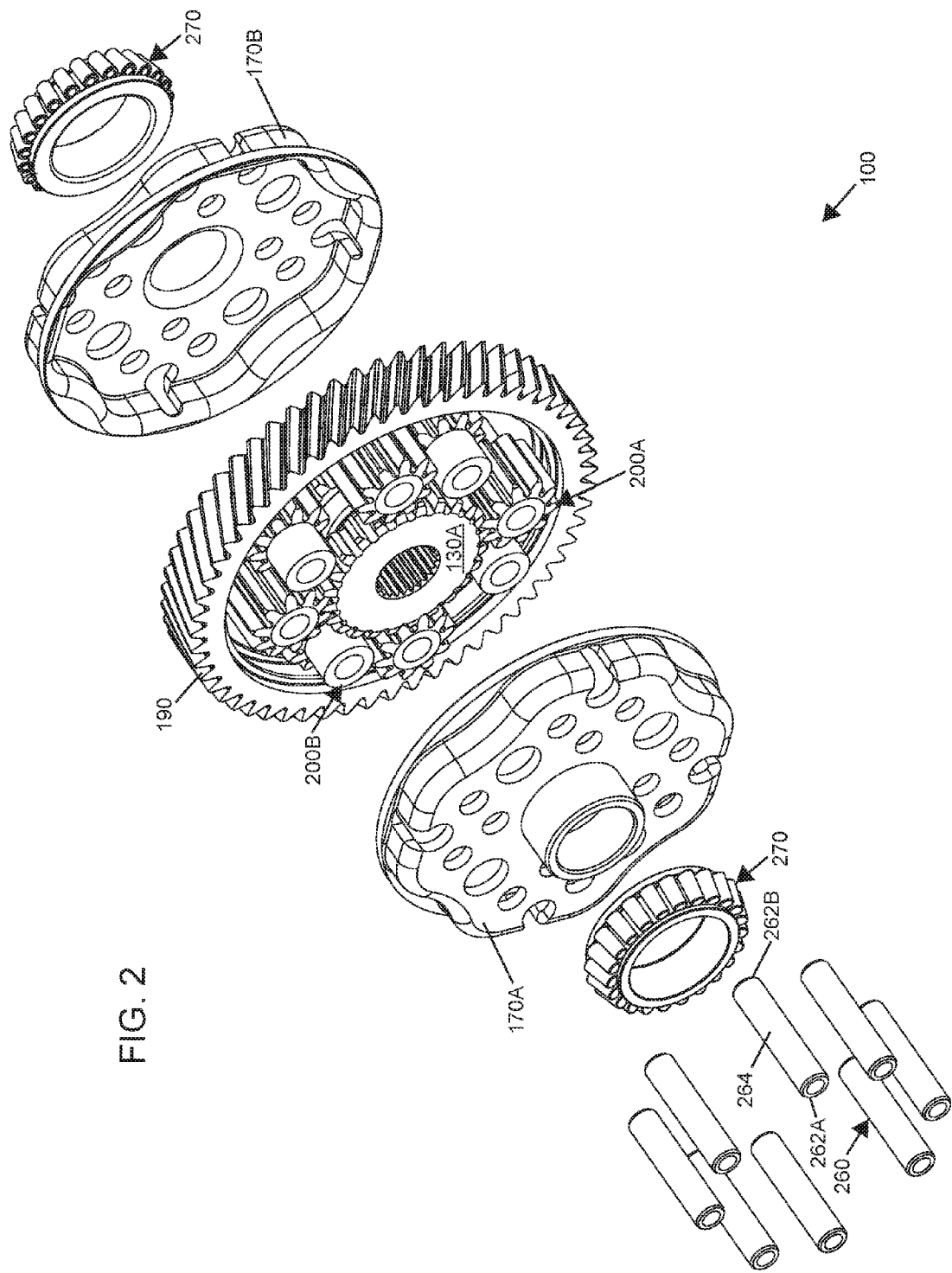
FIG. 2 is an exploded perspective view of the planetary differential gear set arrangement of FIG. 1 illustrating a pair of sun gears, a pair of planet gear sets, a pair of case halves, a ring gear, a set of pins, and a pair of bearing sets.
Figure 3:
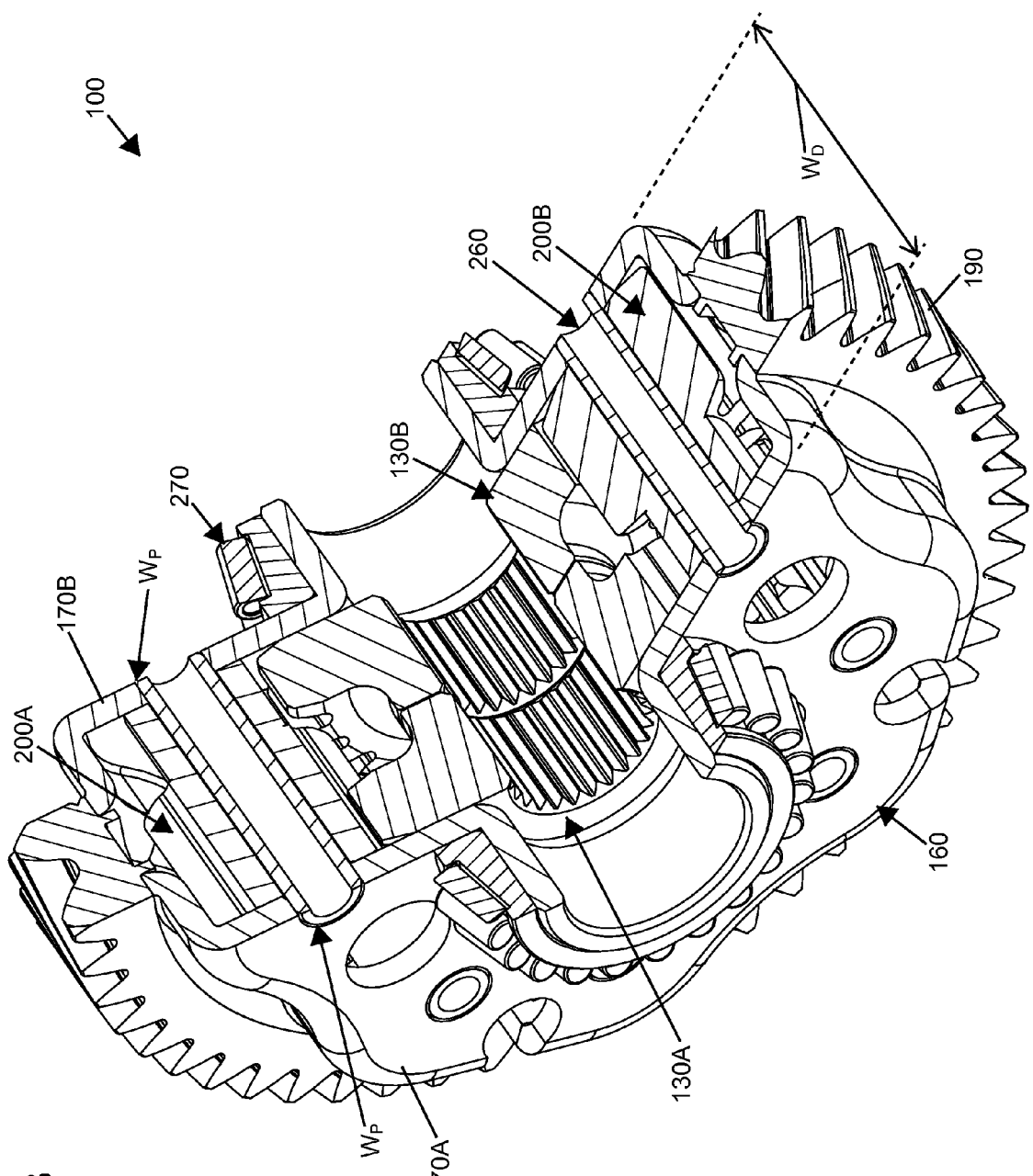
FIG. 3 is the perspective view of FIG. 1, but with a wedge-shaped cut-away taken that passes through centerlines of two opposite planet gears of the pair of planet gear sets of FIG. 2.

According to the principles of the present disclosure, a compact planetary differential gear set arrangement 100 may have improved torque capacity in a given width $W_D$ (see FIG. 3), a given diameter $D_D$ (see FIG. 1), a given volume, a given mass, and/or a given rotational inertia $I_{X-X}$ (see FIG. 1) in comparison to conventional differential designs. The planetary differential gear set 100 may also be built at a lower cost for a given torque capacity than the conventional planetary differential gear sets. The lower cost may result from a lower part number count, elimination of fasteners, automated assembly using fixtures, no post-weld machining, and/or a lower amount of material used.

According to the principles of the present disclosure, the compact planetary differential gear set arrangement 100 includes a carrier 160 that is assembled over a first sun gear 130A, a second sun gear 130B, a first set 200A of planet gears 220A, a second set 200B of planet gears 220B and then welded together. By welding the carrier 160 around the gears 130A, 130B, 220A, 220B, no fasteners are required to operably position the gears 130A, 130B, 220A, 220B relative to each other when the planetary differential gear set 100 is in use. The carrier 160 substantially encloses the first sun gear 130A, the second sun gear 130B, the first set 200A of planet gears 220A, and the second set 200B of planet gears 220B. As the carrier 160 is a weldment, the carrier 160 permanently encloses (e.g., encases) the gears 130A, 130B, 220A, 220B, and the gears 130A, 130B, 220A, 220B are non-removable. Further details of the welding of the carrier 160 are provided hereinafter.

Figure 8:
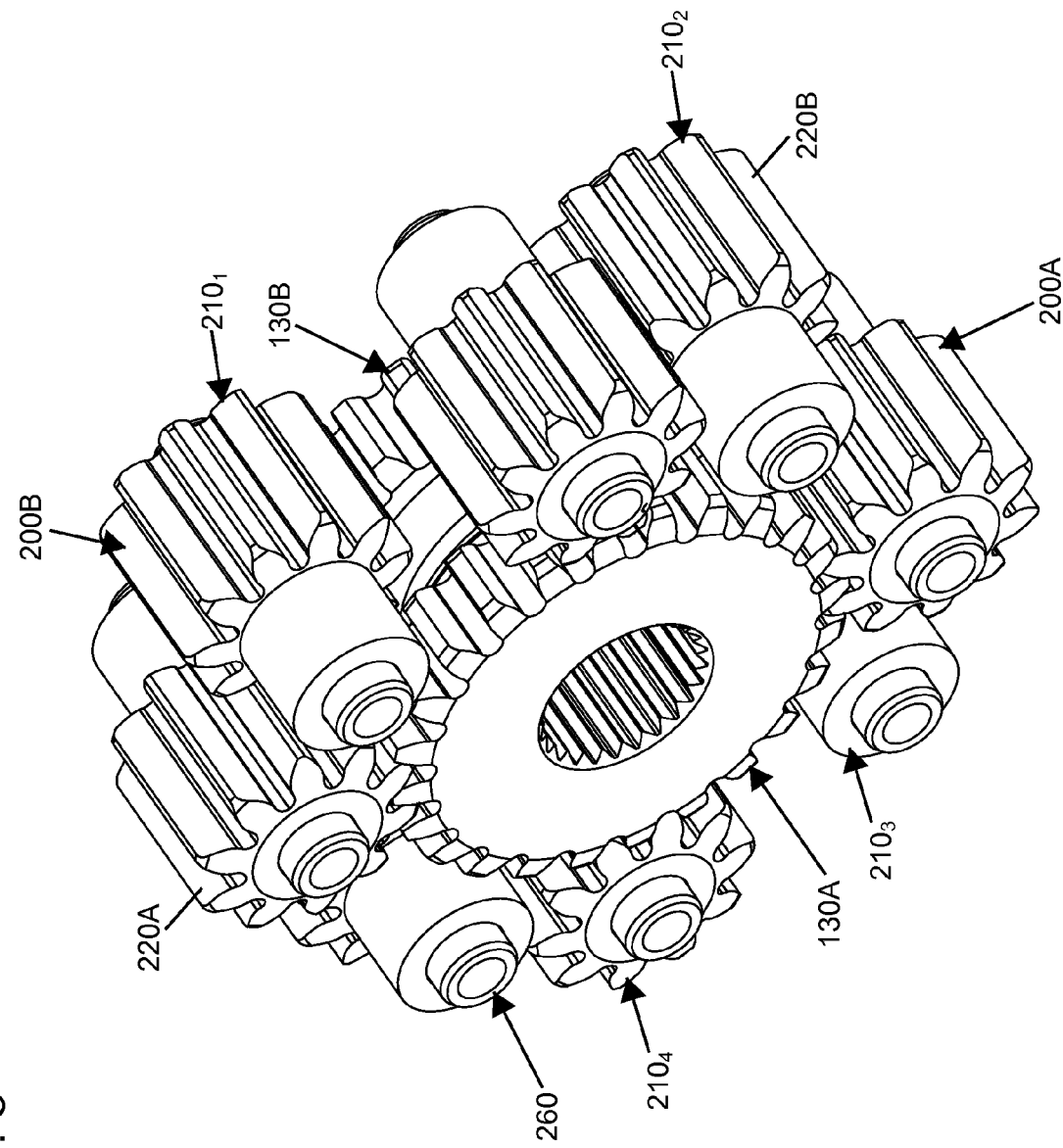
FIG. 8 is the perspective view of FIG. 1, but showing only the pair of sun gears, the pair of planet gear sets, and the set of pins of FIG. 2.
Figure 9:
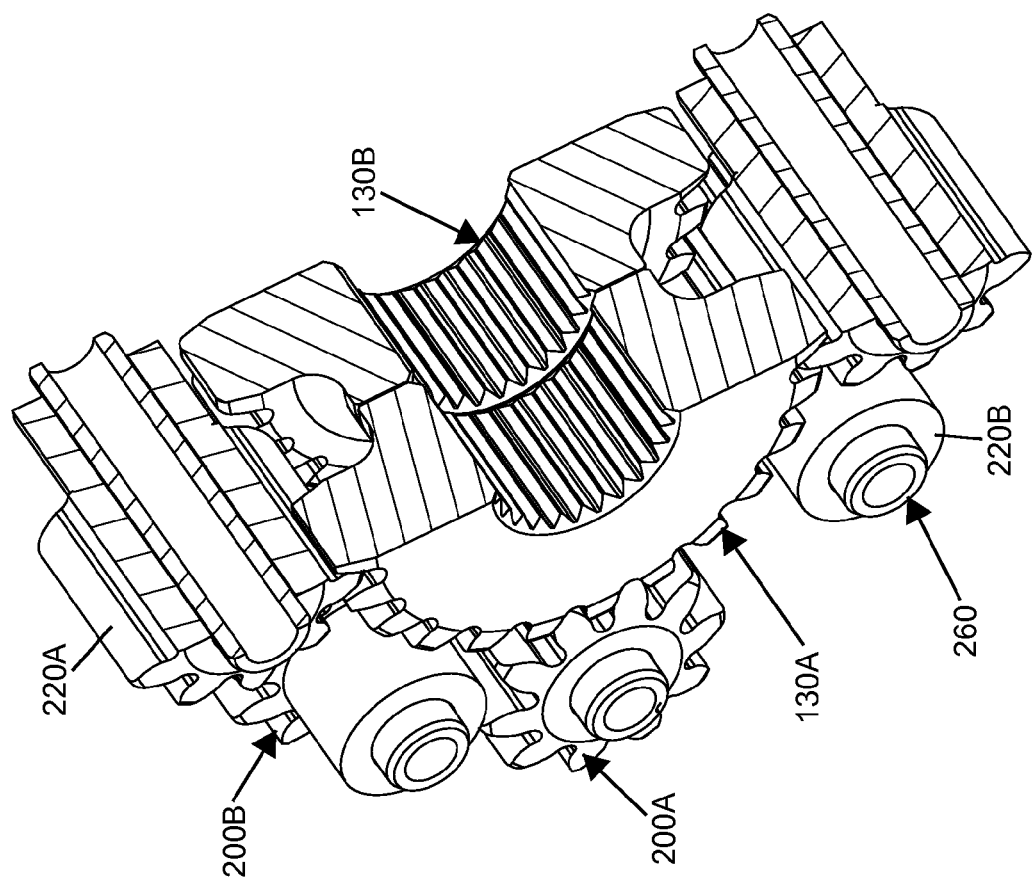
FIG. 9 is the perspective view of FIG. 8, but with a half-cylinder cut-away taken that passes through the centerline of the sun gears of FIG. 4 and the centerlines of the two planet gears of the one of the planet gear sets of FIG. 4.

According to the principles of the present disclosure, the planetary differential gear set arrangement 100 includes a low number of part numbers. In particular, the first sun gear 130A and the second sun gear 130B may be interchangeable with each other (i.e., have the same part number). The first sun gear 130A and the second sun gear 130B may collectively be known as sun gear 130 (see FIGS. 14 and 15). In addition, the planet gears 220A and the planet gears 220B may be interchangeable with each other (see FIGS. 8 and 9). The planet gear 220A and the planet gear 220B may collectively be known as planet gear 220 (see FIGS. 16 and 17). In addition, the carrier 160 may include a first piece 170A and a second piece 170B that are interchangeable with each other (see FIGS. 1-4 and 7) and also include a ring gear 190. The first piece 170A and the second piece 170B may collectively be known as carrier piece 170 (see FIGS. 18-23). Furthermore, the planet gears 220 may be rotatably mounted on pins 260 that are all interchangeable with each other, and the differential arrangement 100 may be rotatably mounted on a pair of identical bearings 270. Thus, as illustrated, the planetary differential gear set arrangement 100 need only include a first part, sun gear 130; a second part, carrier piece 170; a third part, ring gear 190; a fourth part, planet gear 220; a fifth part, pin 260; and a sixth part, bearing 270. Further details of part commonality are provided hereinafter.

Figure 4:
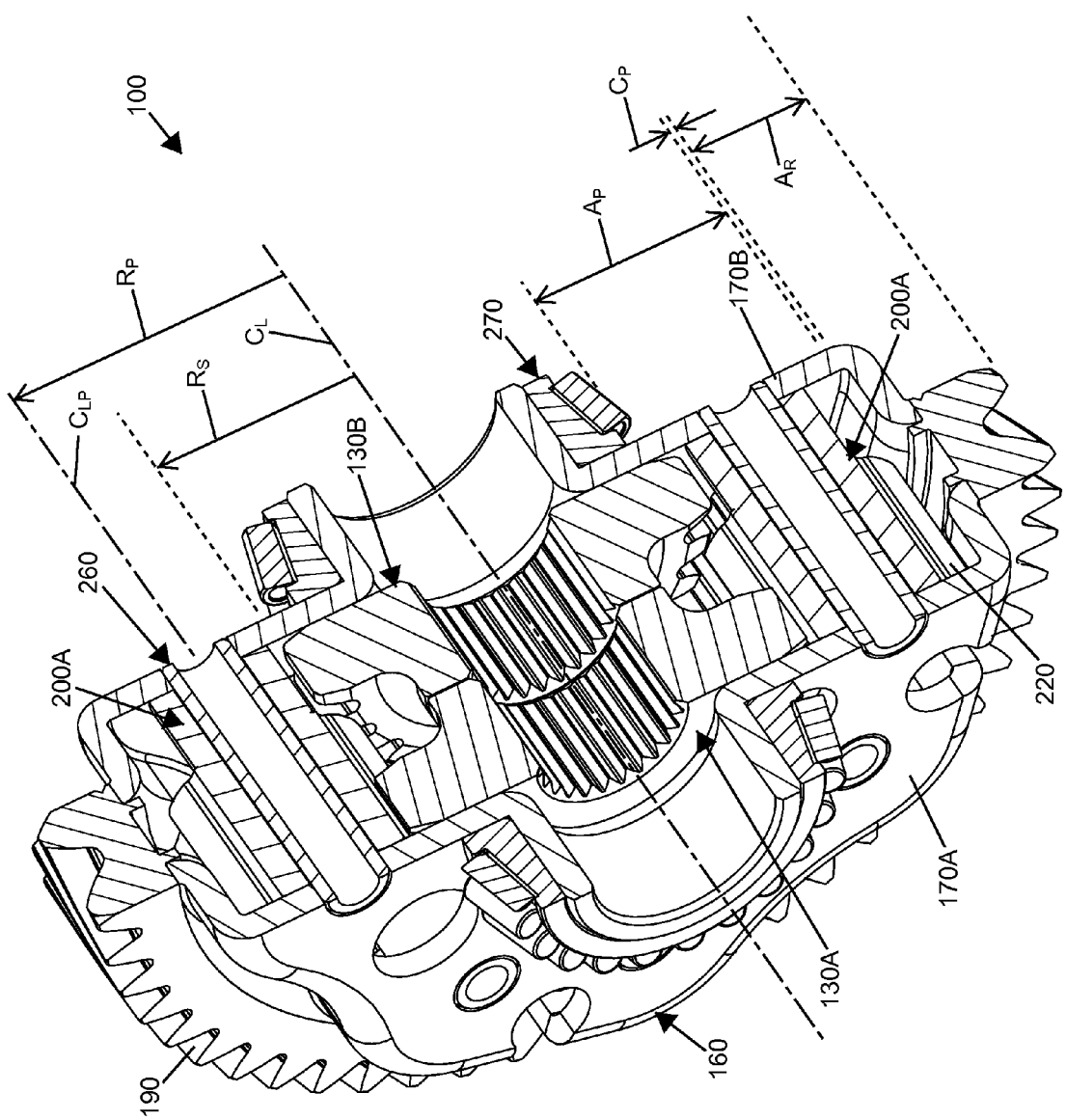
FIG. 4 is the perspective view of FIG. 1, but with a half-cylinder cut-away taken that passes through a centerline of the sun gears of FIG. 2 and centerlines of two planet gears of one of the planet gear sets of FIG. 2.
Figure 5:
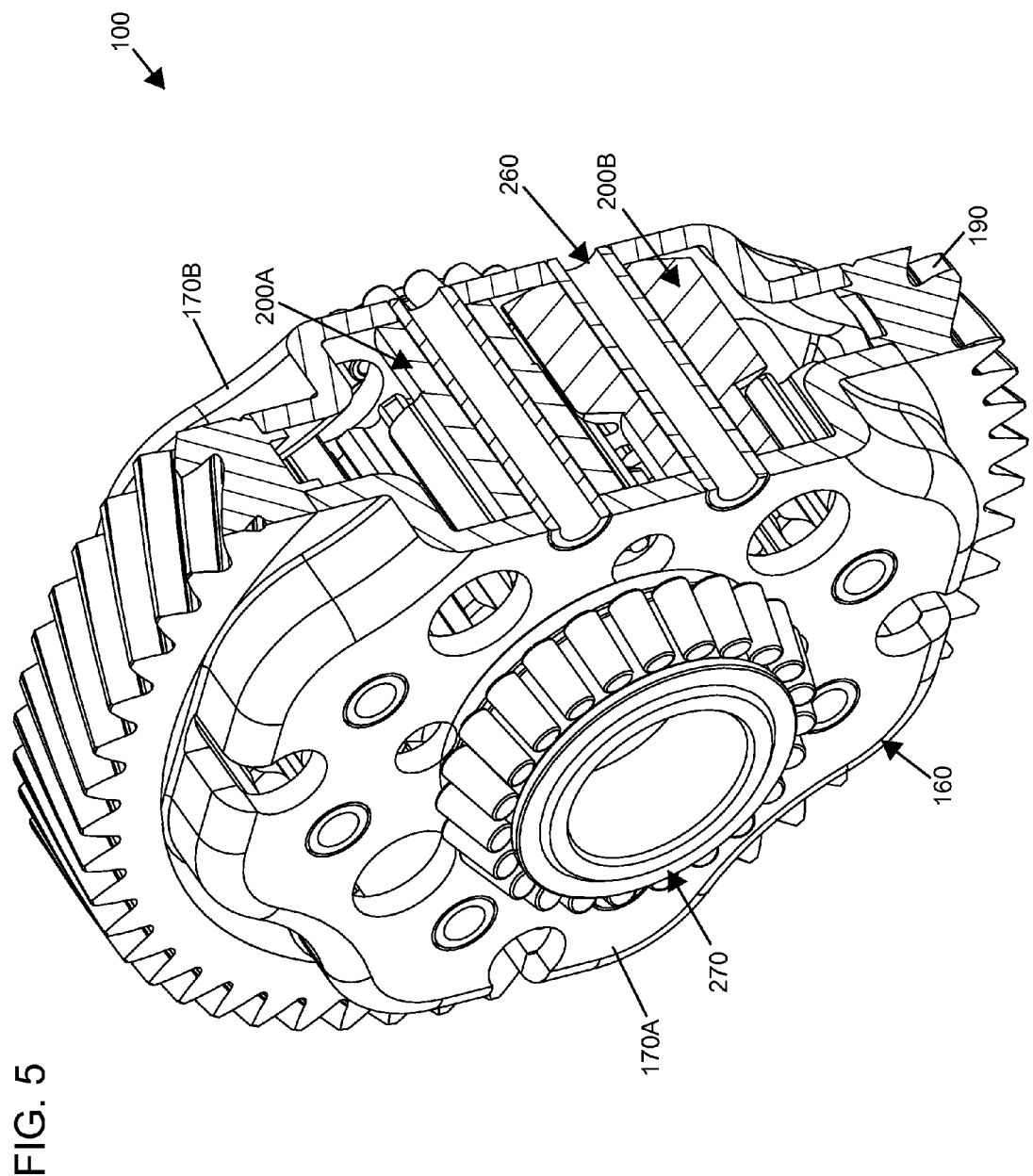
FIG. 5 is the perspective view of FIG. 1, but with a chord-shaped cut-away taken that passes through centerlines of a pair of opposite enmeshed planet gears of the pair of planet gear sets of FIG. 2.

According to the principles of the present disclosure, the compact planetary differential gear set arrangement 100 includes a compact radial arrangement. In particular, as illustrated at FIG. 4, the sun gears 130, 130A, 130B operate within a radial region $R_S$ from a centerline $C_L$ of the differential gear set 100. The planet gears 220, 220A, 220B operate within an annular region $A_P$. And, the ring gear 190 operates within an annular region $A_R$. As depicted, the annular region $A_P$ overlaps the radial region $R_S$ by an amount sufficient to allow meshing of the sun gears 130 with the planet gears 220. As depicted, a clearance $C_P$ exists between the annular region $A_P$ and the annular region $A_R$. The clearance $C_P$ can be quite small and thereby contribute to radial compactness of the planetary differential gear set arrangement 100. In the depicted embodiment, the clearance $C_P$ may be less than a thickness $t_T$ of a tooth T of any one and/or all of the gears 130, 190, 220 (see FIG. 11).

Radial and/or axial compactness in proportion to torque capacity of the planetary differential gear set arrangement 100 may be accomplished by selecting appropriate gear proportions of the gears 130, 190, 220. In certain embodiments, the gears 130, 190, 220 may be straight spur gears. As depicted, the gears 130, 220 are straight spur gears that may have a higher torque capacity than other types of gears (e.g., helical gears). Noise that may be generated by using straight spur gears for the gears 130, 220 may be acceptable given that the gears 130, 220 typically have low or no relative movement in typical operation of a vehicle when the vehicle is normally operated. By using straight spur gears for the gears 130, 220, low or no axial thrust may be generated by the gears 130, 220. In certain embodiments using straight spur gears for the gears 130, 220, no thrust washers and/or thrust bearings are needed to carry thrust loads of the gears 130, 220. Elimination of thrust bearing and/or thrust washers for the gears 130, 220 may increase the axial compactness of the planetary differential gear set arrangement 100. In other embodiments, helical gears and/or other gears may be used for the gears 130, 190, 220. In other embodiments, thrust washers and/or thrust bearings may be used and may carry thrust loads of the gears 130, 220.

In certain embodiments, as depicted, choosing a helical gear as the ring gear 190 may be desired. A pinion gear that meshes with the ring gear 190 may have a high rotational velocity when the vehicle is normally operated. The high velocity may generate significant undesired noise if straight spur gears were used as the pinion gear and the ring gear 190. The pair of the bearings 270 may carry thrust loads generated by the pinion gear and the ring gear 190. The pair of the bearings 270 may further carry separating loads generated by the pinion gear and the ring gear 190.

Choosing an appropriate number of gear teeth T of the gears 130, 190, 220 may increase the radial and/or axial compactness in proportion to torque capacity and thereby contribute to radial compactness of the planetary differential gear set arrangement 100. In the depicted embodiment, the sun gears 130 include 24 gear teeth T, the ring gear 190 includes 56 gear teeth T, and the planet gears 220 include 10 gear teeth T. Choosing an appropriate ratio of pitch diameters of the gears 130, 220 may increase the radial and/or axial compactness in proportion to torque capacity and thereby contribute to radial compactness of the planetary differential gear set arrangement 100. In the depicted embodiment, the ratio of the pitch diameter of the sun gears 130 to the pitch diameter of the planet gears 220 is 12:5.

Figure 7:
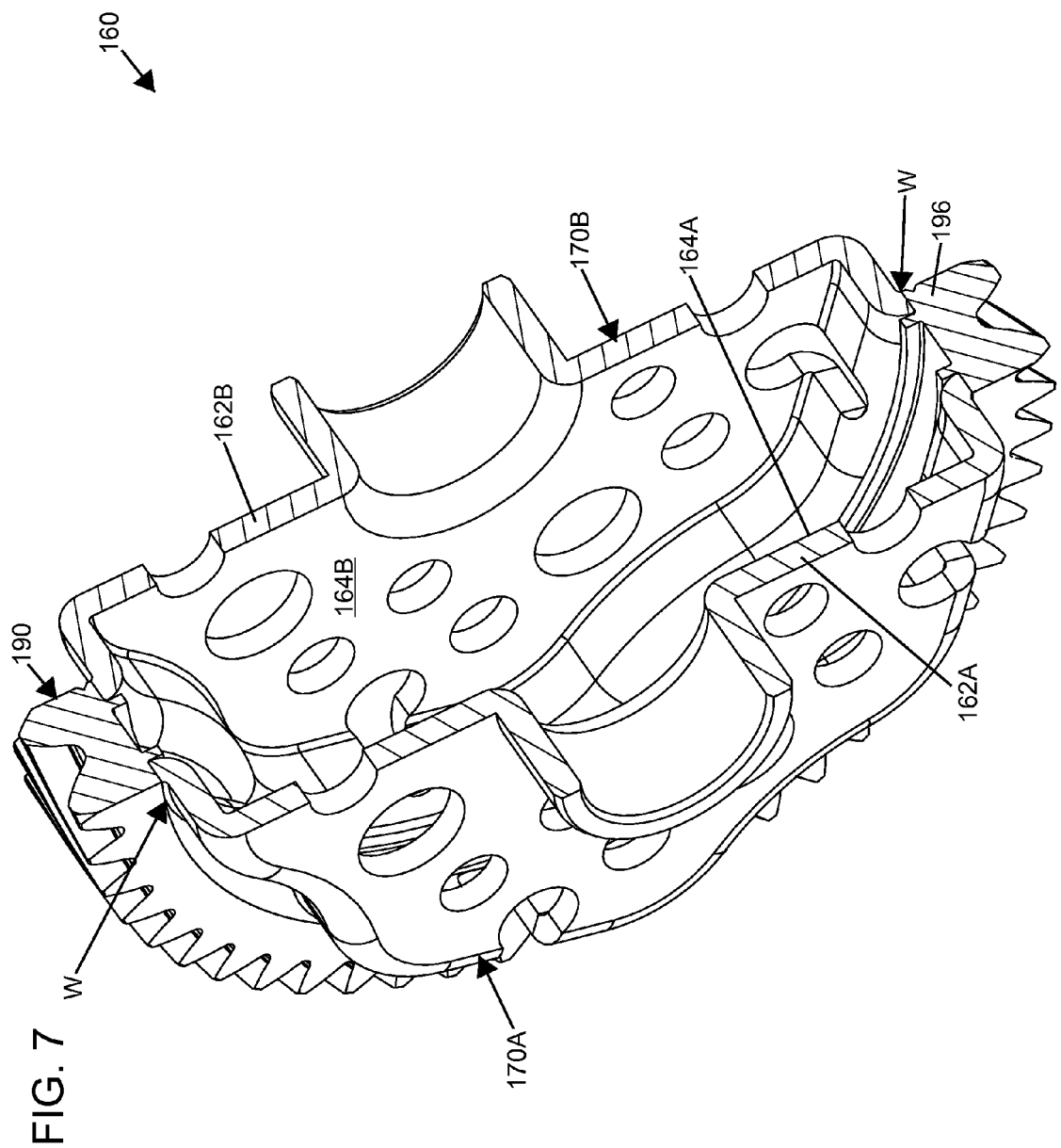
FIG. 7 is the perspective view of FIG. 6, but with a half-cylinder cut-away taken that passes through a centerline of the carrier.

The welding of the carrier 160 may increase the radial and/or axial compactness in proportion to torque capacity and thereby contribute to compactness of the planetary differential gear set arrangement 100. In particular, as depicted at FIG. 7, a weld W joins each of the first piece 170A and the second piece 170B to the ring gear 190. In certain embodiments, a weld W may join the first piece 170A and the second piece 170B to each other. In the illustrated embodiment, the welds W are made by electron beam welding. Electron beam welding results in the welds W occupying only a thin radial region of the planetary differential gear set 100. In addition, electron beam welding results in: a small heat affected zone; substantially no distortion, low distortion, and/or distortion that is locally limited; no detempering of the teeth T of the gears 130, 220, and especially the teeth T of the ring gear 190; no post-weld machining of the planetary differential gear set 100; and allowing a relatively thin gear base 196 of the ring gear 190 (see FIGS. 7, 12, and 13). Welding may further distribute stresses within the carrier 160, including the ring gear 190 and the pins 260, more uniformly than conventional methods (e.g., fasteners). This may allow less material to be used and/or further contribute to compactness of the planetary differential gear set arrangement 100. This may further increase stiffness of the planetary differential gear set arrangement 100.

Using no fasteners may increase the radial and/or axial compactness in proportion to torque capacity and thereby contribute to radial compactness of the planetary differential gear set arrangement 100. In particular, fasteners (e.g., rivets, threaded fasteners, etc.) and their associated holes, bosses, flanges, etc. typically occupy both radial and axial space.

Figure 20:
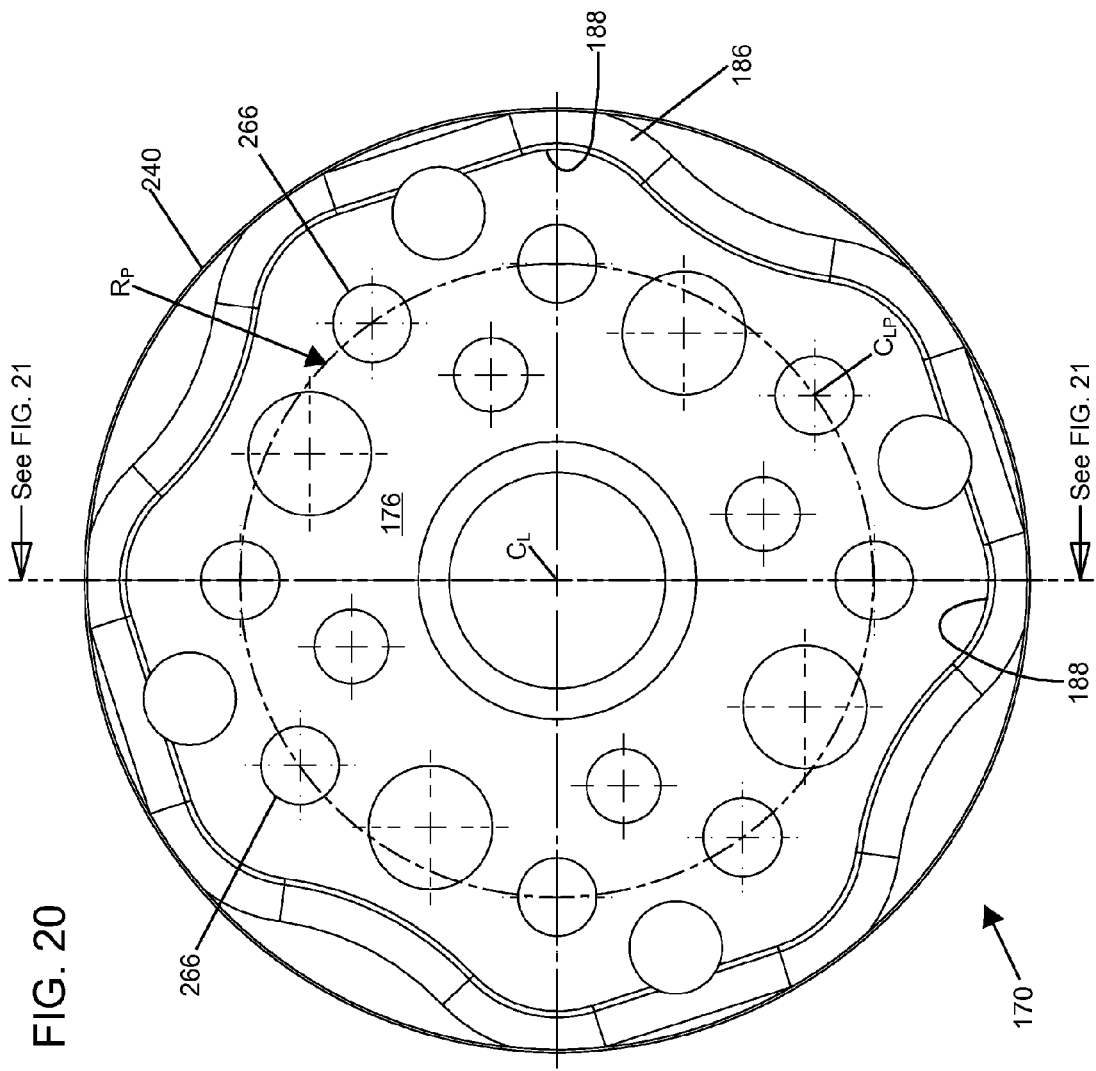
FIG. 20 is another plan view of one of the case halves of FIG. 2 showing an inside of the case half.

As depicted, positioning centerlines $C_{LP}$ of the first set 200A of planet gears 220A and the second set 200B of planet gears 220B at a common radius $R_P$ about the centerline $C_L$ of the differential gear set 100 and the sun gears 130A, 130B may increase the radial and/or axial compactness in proportion to torque capacity and thereby contribute to radial compactness of the planetary differential gear set arrangement 100 (see FIGS. 4 and 20). By positioning the centerlines $C_{LP}$ of all of the planet gears 220 at the common radius $R_P$, the common radius $R_P$ can be a minimum radius consistent with the required torque capacity of the planetary differential gear set arrangement 100. In certain prior art planetary differential gear sets, a centerline radius of a first planetary gear set is different from a centerline radius of a second planetary gear set and thereby results in radial space being consumed to accommodated the larger of the centerline radii. Notwithstanding, in certain other embodiments of the planetary differential gear set arrangement 100, the centerlines $C_{LP}$ of the first set 200A of planet gears 220A and the second set 200B of planet gears 220B may be positioned at different radii.

According to the principles of the present disclosure, the planetary differential gear set arrangement 100 may be configured to include at least four intermeshing planet gear pairs $210_{1-4}$ (see FIGS. 5, 8, 10, and 11). Such configuration may be made possible, at least in part, from the compacting features disclosed herein. Certain prior art planetary differential gear sets include only three planet gear pairs due, at least in part, to non-efficient used of space. By including more than three planet gear pairs, additional torque capacity is gained for the planetary differential gear set arrangement 100.

In particular detail, each of the intermeshing planet gear pairs 210 includes one of the first planet gears 220A enmeshed with the first sun gear 130A and one of the second planet gears 220B enmeshed with the second sun gear 130B. As depicted, the first planet gear 220A meshes with the first sun gear 130A along an axial zone $Z_A$ generally corresponding to a width of the teeth T of the first sun gear 130A, and the second planet gear 220B meshes with the second sun gear 130B along an axial zone $Z_B$ generally corresponding to a width of the teeth T of the second sun gear 130B. Each of the intermeshing planet gear pairs 210 intermeshes within an axial zone $Z_C$ generally corresponding to an axial space between the teeth T of the first sun gear 130A and the teeth T of the second sun gear 130B. In particular, the first planet gear 220A of the intermeshing planet gear pair 210 meshes with the second planet gear 220B of the same intermeshing planet gear pair 210. A tooth pitch, pitch circle, tooth form, etc. of the first planet gear 220A may remain the same along a width of its teeth T and across the axial zones $Z_A$ and $Z_C$.

Likewise, a tooth pitch, pitch circle, tooth form, etc. of the second planet gear 220B may remain the same along a width of its teeth T and across the axial zones $Z_B$ and $Z_C$.

Turning now to FIGS. 12 and 13, the ring gear 190 will be described in detail. As depicted, the ring gear 190 extends between a first side 192A and a second side 192B. The first and second sides 192A and 192B are generally parallel to each other and perpendicular to the centerline $C_L$ of the differential gear set 100 and the sun gears 130A, 130B and the centerlines $C_{LP}$ of the planet gears 220. As depicted, the teeth T of the ring gear 190 generally extend between the first and second sides 192A and 192B and are helical teeth. The teeth T of the ring gear 190 also extend from an outer perimeter 194 of the ring gear 190 to the gear base 196. The gear base 196 radially extends between the teeth T of the ring gear 190 and an innermost surface 198 of the ring gear 190. As depicted, the innermost surface 198 is positioned beyond an outermost cylinder that is occupied by the planet gears 220 (i.e., an outer cylinder of the annular region $A_P$).

The gear base 196 may serve as a structural support for the teeth T of the ring gear 190, as a locating and stopping feature for the first piece 170A and the second piece 170B, as a joining piece for the first piece 170A and the second piece 170B, and as a weld pad that isolates the teeth T of the ring gear 190 from weld distortion and a heat affected zone of the welds W. As depicted, the gear base 196 includes a first cylindrical surface 250A and a second cylindrical surface 250B. The first cylindrical surface 250A may be a first high precision cylindrical surface, and the second cylindrical surface 250B may be a second high precision cylindrical surface. The high precision cylindrical surfaces 250A, 250B may be capable of holding a press fit. The cylindrical surfaces 250A, 250B may be concentric with each other and/or with the innermost surface 198 of the ring gear 190. As depicted, the gear base 196 includes a first shoulder stop 252A and a second shoulder stop 252B. The shoulder stops 252A, 252B extend radially inwardly from the cylindrical surfaces 250A, 250B, respectively, to the innermost surface 198 of the ring gear 190. The shoulder stops 252A, 252B may be separated from each other by a recessed area 254. The recessed area 254 may include a third cylindrical surface 254 with generally the same diameter as the cylindrical surfaces 250A, 250B. The cylindrical surfaces 250A and/or 250B may be concentric with the third cylindrical surface 254. The shoulder stops 252A, 252B may be positioned symmetrically about the ring gear 190 along the centerline $C_L$ of the differential gear set 100, the sun gears 130A, 130B, and the ring gear 190. The ring gear 190 may include a groove 256. The groove 256 may be positioned on the second side 192B and may serve as an indicator of the second side 192B and may therefore serve as an orientation indicator of the planetary differential gear set arrangement 100.

Figure 14:
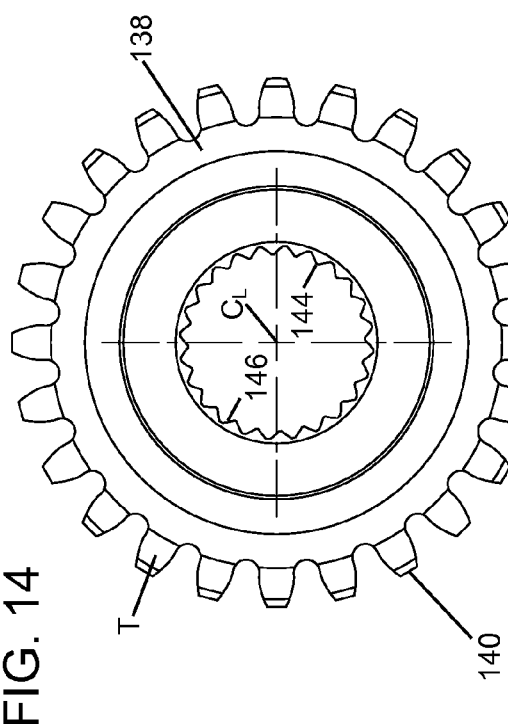
FIG. 14 is a plan view of one of the sun gears of FIG. 2.
Figure 15:
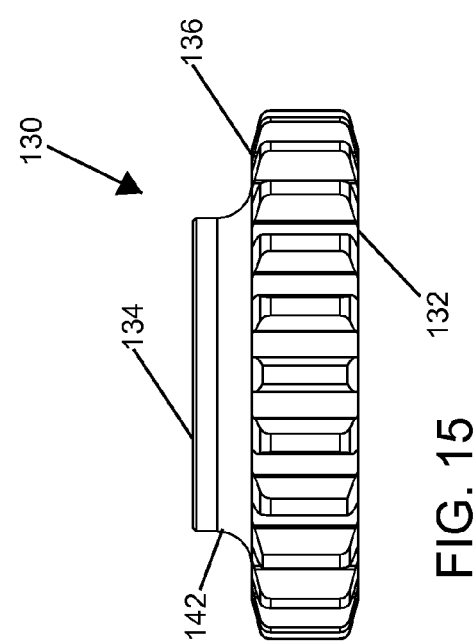
FIG. 15 is a side view of the one of the sun gears of FIG. 14.
Figure 21:
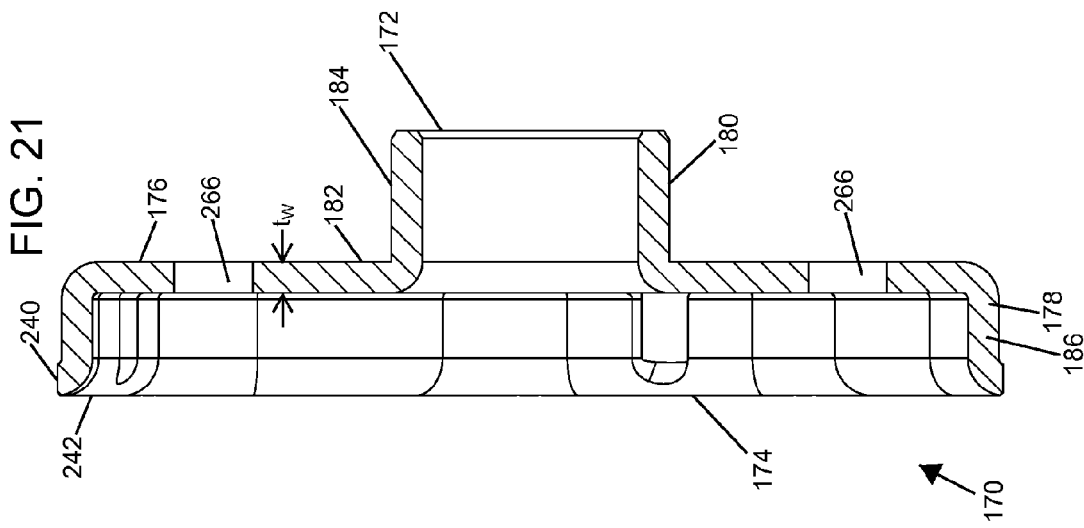
FIG. 21 is a cross-sectional side elevation view of the one of the case halves of FIG. 20 as called out at FIG. 20.

Turning now to FIGS. 14 and 15, the sun gear 130 will be described in detail. As depicted, the sun gear 130 extends between a first side 132 and a second side 134. The first and second sides 132 and 134 are generally parallel to each other and perpendicular to the centerline $C_L$ of the sun gear 130 and the centerlines $C_{LP}$ of the planet gears 220. As depicted, the teeth T of the sun gear 130 generally extend between the first side 132 and a medial plane 136. The teeth T of the sun gear 130 generally radially extend between a gear base 138 and an outer perimeter 140 of the sun gear 130. A reduced diameter portion 142 extends between the medial plane 136 and the second side 134. The reduced diameter portion 142 of each of the sun gears 130A, 130B forms about half of the axial zone $Z_C$ and allows the teeth T of the planet gears 220 to extend within a cylinder defined by the outer perimeter 140 without meshing with the teeth T of the sun gear 130. The gear base 138 radially extends between the teeth T of the sun gear 130 and an innermost surface 144 of the sun gear 130. As depicted, the innermost surface 144 is included on a female spline 146 that is adapted to rotationally couple to a male spline of a drivetrain shaft (e.g., an axle, a drive shaft, etc.) of a vehicle.

Figure 16:
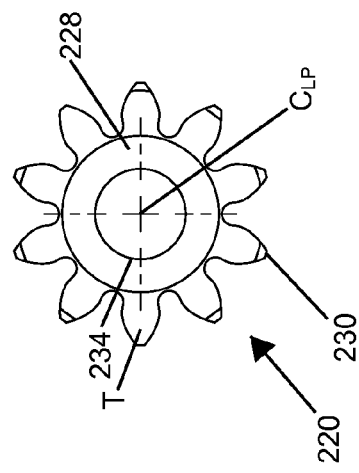
FIG. 16 is a plan view of one of the planet gears of FIG. 3.
Figure 17:
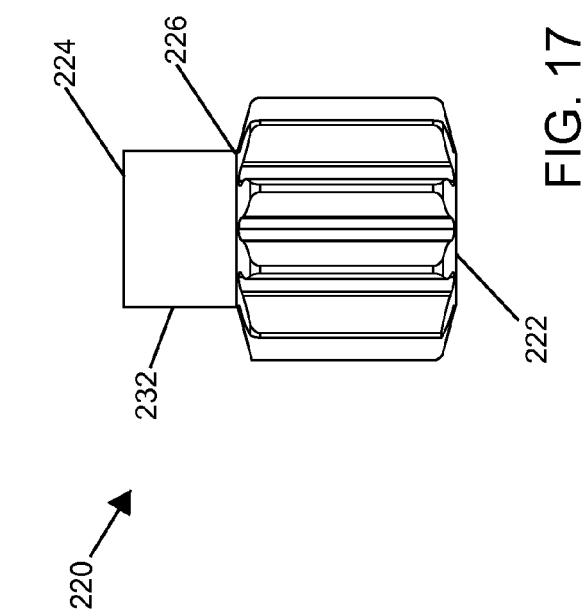
FIG. 17 is a side view of the one of the planet gears of FIG. 16.

Turning now to FIGS. 16 and 17, the planet gear 220 will be described in detail. As depicted, the planet gear 220 extends between a first side 222 and a second side 224. The first and second sides 222 and 224 are generally parallel to each other and perpendicular to the centerline $C_L$ of the sun gear 130 and the centerlines $C_{LP}$ of the planet gears 220. As depicted, the teeth T of the planet gear 220 generally extend between the first side 222 and a medial plane 226. The teeth T of the planet gear 220 generally radially extend between a gear base 228 and an outer perimeter 230 of the planet gear 220. A reduced diameter portion 232 extends between the medial plane 226 and the second side 224. The reduced diameter portion 232 of the planet gears 220 extends over the axial zones $Z_A$ or $Z_B$ and allows the teeth T of the sun gear 130A or 130B, respectively, to extend within a cylinder defined by the outer perimeter 230 without meshing with the teeth T of the planet gear 220A or 220B, respectively. The gear base 228 radially extends between the teeth T of the planet gear 220 and an innermost surface 234 of the planet gear 220. As depicted, the innermost surface 234 includes a bearing surface that is adapted to rotatably mount to the pins 260. The reduced diameter portion 232 of the first planet gear 220A may clear the second sun gear 130B, and the reduced diameter portion 232 of the second planet gear 220B may clear the first sun gear 130A.

Turning now to FIGS. 18-23, the carrier piece 170 will be described in detail. As depicted, the carrier piece 170 extends between a first side 172 and a second side 174. The first and second sides 172 and 174 are generally parallel to each other and perpendicular to the centerline $C_L$ of the sun gear 130 and the carrier piece 170 and the centerlines $C_{LP}$ of the planet gears 220. As depicted, the carrier piece 170 includes a first cylindrical surface 240 and a second cylindrical surface 180. The first cylindrical surface 240 may be a first high precision cylindrical surface, and the second cylindrical surface 180 may be a second high precision cylindrical surface. The high precision cylindrical surfaces 180, 240 may be capable of holding a press fit. The cylindrical surfaces 180, 240 may be concentric with each other. As depicted, the carrier piece 170 includes a first stop 242 (e.g., a shoulder stop) and a second stop 182 (e.g., a shoulder stop). The stop 242 extends radially inwardly from the cylindrical surface 240. The stop 182 extends radially outwardly from the cylindrical surface 180. The stops 182, 242 may be spaced from each other by a distance $D_C$ (see FIG. 23). The distance $D_C$ may be a high precision distance. The shoulder stops 182, 242 of the first piece 170A may be positioned symmetrically with respect to the shoulder stops 182, 242 of the second piece 170B about the ring gear 190 along the centerline $C_L$ of the differential gear set 100, the sun gears 130A, 130B, and the ring gear 190. The shoulder stops 182, 242 of the first piece 170A may be positioned symmetrically with respect to the shoulder stops 182, 242 of the second piece 170B about the planetary differential gear set arrangement 100 along the centerline $C_L$.

As depicted, the carrier piece 170 may be stamped, spun, and/or forged from a single piece of raw material. The raw material may be a plate, a billet, a tube, etc. The stamping, spinning, and/or forging may work harden the carrier piece 170. In other embodiments, the carrier piece 170 may be a casting, a machined piece, etc. In certain embodiments, a portion or all of the carrier piece 170 may be stress and/or strain relieved (e.g., by heating). In certain embodiments, a portion or all of the carrier piece 170 may be shot-peened. As depicted, the carrier piece 170 generally defines a wall 178 with a wall thickness $t_W$. The wall thickness $t_W$ may vary or the wall thickness $t_W$ may remain substantially constant. The wall 178 may form at least a portion of the cylindrical surfaces 180, 240 and the stops 182, 242. Additionally, the wall 178 may form at least a portion of a radial portion 176 and/or a lateral portion 186 of the carrier piece 170. The radial portion 176 of the first piece 170A may form a first side 162A, and the radial portion 176 of the second piece 170B may form a second side 162B of a hub (see FIG. 1). At least a portion of the cylindrical surface 180 may form a snout 184 upon which the bearing 270 may be mounted (see FIG. 21). The bearing 270 may bottom against the stop 182 and thereby be located by the stop 182. By welding the carrier piece 170 to the ring gear 190 and forming the lateral portion 186 on the carrier piece 170, the planet gears 220 may be separated (i.e., spaced) from the ring gear 190 by as little as the wall thickness $t_W$.

The carrier 160 may include a first wall 164A and a second wall 164B formed by insides of the first side 162A and the second side 162B, respectively. The walls 164A, 164B are spaced from each other. The planet gears 220 may each substantially extend between the first wall 164A and the second wall 164B.

Figure 6:
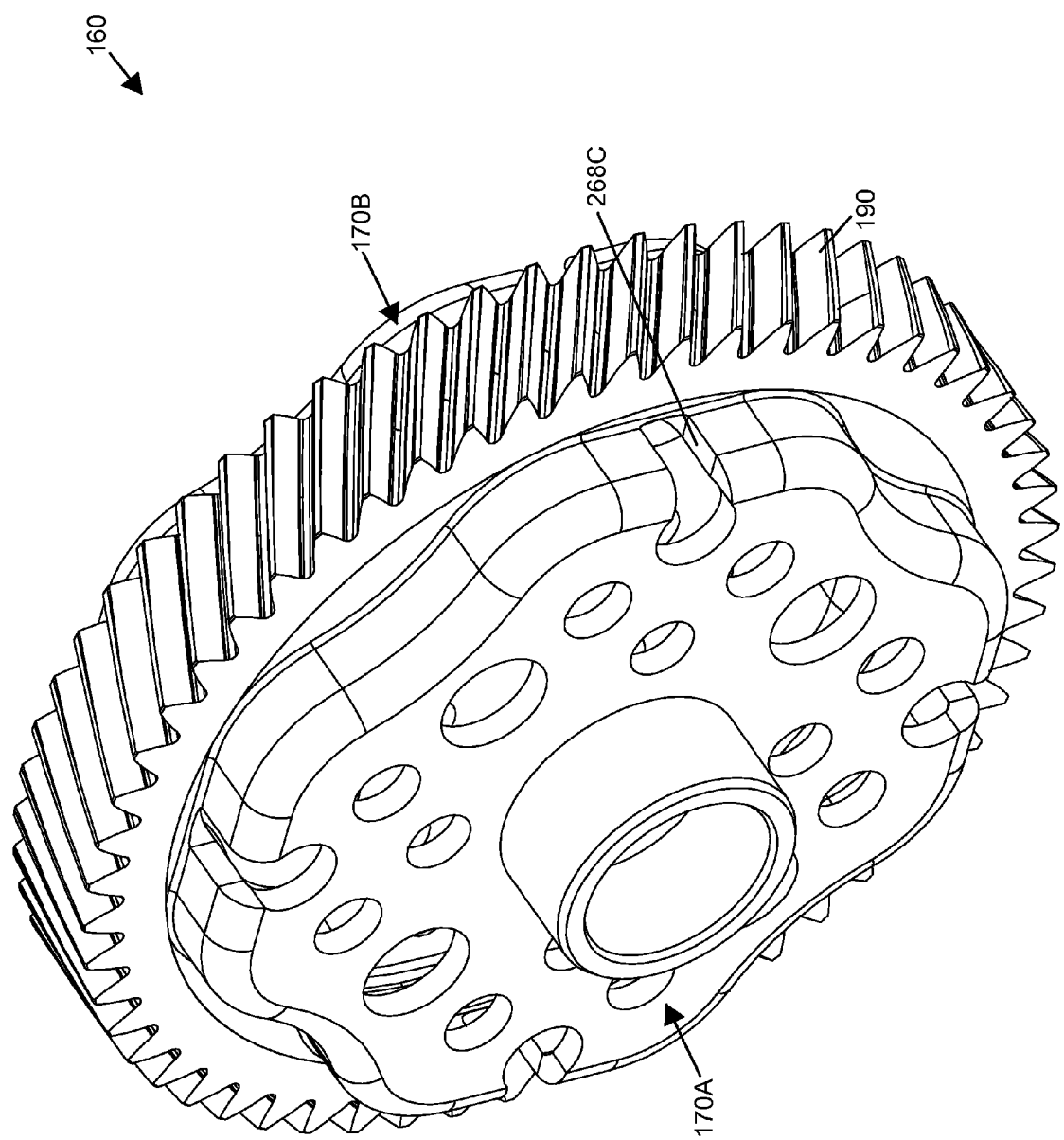
FIG. 6 is the perspective view of FIG. 1, but showing only the pair of case halves and the ring gear of FIG. 2 formed into a carrier.

As depicted at FIGS. 18-23, the radial portion 176 include a series of pin holes 266, a series of holes 268A, a series of holes 268B, and a series of holes 268C. As depicted, the holes 268C extend beyond the radial portion 176 and into the lateral portion 186. As depicted, the holes 266, 268A, and 268B are round or substantially round holes. In other embodiments, the holes 266, 268A, and 268B may have other shapes. As depicted, the hole 268C includes a round portion and a slot-shaped portion that extends to the lateral portion 186 (see also FIG. 6). In other embodiments, the holes 268C may have other shapes. In the depicted embodiment, the pin holes 266 mount the pins 260. In particular, the pin holes 266 of the first piece 170A mount first end portions 262A of the pins 260, and the pin holes 266 of the second piece 170B mount second end portions 262B of the pins 260 (see FIG. 2). The holes 268A, 268B, and 268C may reduce rotational inertia, may reduce mass, may tailor stiffness of the carrier piece 170, and/or may improve lubrication and oil flow. The tailored stiffness of the carrier piece 170 may accommodate press fitting the first cylindrical surface 240 into the cylindrical surfaces 250A or 250B. The tailored stiffness of the carrier piece 170 may accommodate a lower tolerance of the first cylindrical surface 240 and/or the cylindrical surfaces 250A, 250B.

In the depicted embodiment, the lateral portion 186 undulates and forms pockets 188 centered on the pin holes 266. The pockets 188 may each house at least a portion of one of the planet gears 220. By undulating, the lateral portion 186 may stiffen the carrier piece 170 and thereby stiffen the planetary differential gear set arrangement 100. By undulating, the lateral portion 186 may reduce rotational inertia.

In the depicted embodiment, the differential gear set 100, including the pinion gear, is governed by the equation $$K \times (V_1 + V_2)/2 = V_3$$

where K is a gear ratio of the pinion and ring gear set, $V_1$ is a rotational velocity of the first sun gear 130A, $V_2$ is a rotational velocity of the second sun gear 130B, and $V_3$ is a rotational velocity of the pinion gear that drives the ring gear 190 of the carrier 160.

In the depicted embodiment, the differential gear set 100, excluding the pinion gear, is governed by the equation $$(V1+V2)/2=V_3$$

where $V_1$ is the rotational velocity of the first sun gear 130A, $V_2$ is the rotational velocity of the second sun gear 130B, and $V_3$ is a rotational velocity of the carrier 160.

In other embodiments, the differential gear set 100 may be governed by the equation $$(n_1 \times V_1 + n_2 \times V_2) = (n_1+n_2) \times V_3$$

where $n_1$ and $n_2$ are gear ratios of the differential gear set 100, $V_1$ is a rotational velocity of a first input/output member 130A, $V_2$ is a rotational velocity of a second input/output member 130B, and $V_3$ is a rotational velocity of a third input/output member (e.g., a pinion).

A method for assembling the planetary differential gear set 100 may include one or more of the steps below. The steps need not necessarily be performed in the order in which they appear. All of the steps need not necessarily be performed. Additional steps may be added. 1) Provide the first piece 170A of the carrier 160. 2) Position the first sun gear 130A adjacent the first piece 170A. In particular, position the first side 132 of the first sun gear 130A adjacent the first wall 164A of the first piece 170A with the centerline $C_L$ of the first sun gear 130A aligned with the centerline $C_L$ of the first carrier piece 170A. 3) Position the first set 200A of the planet gears 220A adjacent the first piece 170A. In particular, position the first side 222 of the planet gears 220A adjacent the first wall 164A of the first piece 170A with the centerline $C_{LP}$ of each of the planet gears 220A aligned with a corresponding center of one of the pin holes 266. 4) Position the ring gear 190 adjacent the first piece 170A. In particular, position the first cylindrical surface 250A around the first cylindrical surface 240 and move and/or press the ring gear 190 and the first piece 170A together until the first stop 242 abuts the first shoulder stop 252A. 5) Position the second sun gear 130B adjacent the first sun gear 130A. In particular, position the second sides 134 of the sun gears 130A and 130B adjacent each other with their centerlines $C_L$ aligned. 6) Position the second set 200B of the planet gears 220B adjacent the first set 200A. In particular, position the second side 224 of the planet gears 220B adjacent the first wall 164A of the first piece 170A with the centerline $C_{LP}$ of each of the planet gears 220B aligned with a corresponding center of one of the pin holes 266. 7) Position the second piece 170B of the carrier 160 adjacent the ring gear 190. In particular, position the second cylindrical surface 250B around the second cylindrical surface 240 and move and/or press the ring gear 190 and the second piece 170B together until the first stop 242 abuts the second shoulder stop 252B while the centerline $C_{LP}$ of each of the planet gears 220 is aligned with a corresponding center of one of the pin holes 266 of the second piece 170B. 8) Secure and/or position some or all of the above parts with a fixture. 9) Insert and/or press the pins 260 into and/or through the holes 266, 234 with a bearing surface 264 (see FIG. 2) of each of the pins 260 engaging a corresponding one of the bearing surfaces 234 of the planet gears 220. 10) Form the weld W between the first piece 170A and the ring gear 190. 11) Form the weld W between the second piece 170B and the ring gear 190. 12) Weld the first piece 170A and the second piece 170B of the carrier 160 together. 13) Form a weld $W_P$ between the first piece 170A and the pins 260. 14) Form a weld $W_P$ between the second piece 170B and the pins 260. And/or, 15) remove the fixture.

As mentioned above, the above steps do not necessarily need to be preformed in the order listed. Some or all of the steps may be performed substantially simultaneously. Some of the above steps may be omitted. Other steps may be added. The welding may include electron beam welding.

In one example, the width $W_D$ (i.e., hub span) can be shown to be about 54% of a width of a typical differential mechanism with the same torque capacity. The overall diameter $D_D$ can be about the same as the typical differential mechanism, but weight of the planetary differential gear set arrangement 100 can be about 88% of the typical differential mechanism, including the ring gear 190. In certain embodiments of the planetary differential gear set arrangement 100, torque bias can be one-to-one and torque capacity can be the same or greater than the typical differential mechanism. In certain embodiments, the planetary differential gear set arrangement 100 may be a compact open differential. In certain embodiments, the planetary differential gear set arrangement 100 may have near zero bias. In certain embodiments, the planetary differential gear set arrangement 100 may be configured as a limited slip, a viscous coupled, and/or a locking differential and include corresponding components. In the depicted embodiment, the bearings 270 are roller bearings.

In certain embodiments, such as vehicle axle and/or transfer case applications, the first sun gear 130A is adapted to drive a first drivetrain shaft (e.g., an axle, a drive shaft, etc.) of a vehicle, and the second sun gear 130B is adapted to drive a second drivetrain shaft (e.g., an axle, a drive shaft, etc.) of the vehicle.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A planetary differential gear set comprising:
   a first sun gear;
   a second sun gear coaxially aligned with the first sun gear;
   a first set of pins;
   a first set of planet gears rotatably mounted on the first set of pins and meshed with the first sun gear;
   a second set of pins;
   a second set of planet gears rotatably mounted on the second set of pins and meshed with the second sun gear;
   a plurality of intermeshing planet gear pairs, each of the intermeshing planet gear pairs including a first planet gear of the first set of planet gears and a second planet gear of the second set of planet gears, the planet gears of the first and second sets of planet gears each including a first axial section having gear teeth and a second axial section not having gear teeth;
   a ring gear; and
   a carrier that substantially encloses the first sun gear, the second sun gear, the first set of planet gears, and the second set of planet gears, the carrier including first and second carrier housing pieces that respectively define first and second opposite major axial sides of the carrier, the first and second carrier housing pieces each defining a central opening in co-axial alignment with the first and second sun gears, the first and second carrier housing pieces including outer bearing-mount sleeves that surround the central openings, the ring gear being co-axially aligned with the first and second sun gears and being mounted between the first and second carrier housing pieces such that the ring gear maintains a fixed axial spacing between the first and second carrier housing pieces, the first carrier housing piece being secured at a first axial side of the ring gear by a first perimeter weld between the ring gear and the first carrier housing piece, the second carrier housing piece being secured at a second axial side of the ring gear by a second perimeter weld between the ring gear and the second carrier housing piece, the first and second carrier housing pieces each including a first set of pin holes and a second set of pin holes, the first set of pin holes mounting the first set of pins, and the second set of pin holes mounting the second set of pins;

wherein the first sun gear, the second sun gear, the first set of planet gears, and the second set of planet gears are permanently enclosed by the carrier and thereby are not removable from the carrier;

wherein the second sun gear and the first sun gear are interchangeable parts with each other;

wherein the planet gears of the first set and the second set of planet gears are interchangeable with each other; and wherein the first carrier housing piece and the second carrier housing piece of the carrier are interchangeable with each other.

2. The planetary differential gear set of claim 1, wherein the first sun gear is adapted to drive a first axle of an automobile and the second sun gear is adapted to drive a second axle of the automobile.

3. The planetary differential gear set of claim 1, wherein the first sun gear is adapted to drive a first drive shaft of a vehicle and the second sun gear is adapted to drive a second drive shaft of the vehicle.

4. The planetary differential gear set of claim 1, wherein the first set of planet gears and the second set of planet gears are positioned about the sun gears at a common radius.

5. The planetary differential gear set of claim 1, further comprising:
at least four of the intermeshing planet gear pairs;
wherein the ring gear defines an innermost surface, the innermost surface of the ring gear positioned beyond an outermost cylinder occupied by the intermeshing planet gear pairs.

6. The planetary differential gear set of claim 5, wherein the innermost surface of the ring gear defines a radius spaced from the outermost cylinder occupied by the intermeshing planet gear pairs by a radial distance that is less than a thickness of a tooth of the gear teeth of the first axial section of the planet gears.

7. The planetary differential gear set of claim 1, wherein the first and second carrier housing pieces of the carrier respectively include a first wall and a second wall that are spaced from each other, wherein the first and the second planet gear of the plurality of intermeshing planet gear pairs each substantially extend between the first wall and the second wall.

8. The planetary differential gear set of claim 7, wherein the first sun gear substantially extends between the first wall and the second sun gear and wherein the second sun gear substantially extends between the first sun gear and the second wall.

9. The planetary differential gear set of claim 1, wherein the second axial section of the planet gears each include a reduced diameter portion, the reduced diameter portion of the first planet gear clearing the second sun gear and the reduced diameter portion of the second planet gear clearing the first sun gear.

10. The planetary differential gear set of claim 1, wherein the ring gear includes a first stop and a second stop spaced from the first stop by a distance corresponding to the fixed axial spacing between the first and second carrier housing pieces and wherein the first carrier housing piece of the carrier abuts the first stop and the second carrier housing piece of the carrier abuts the second stop thereby spacing the first carrier housing piece from the second carrier housing piece by the distance.

11. The planetary differential gear set of claim 1, wherein the first and the second sun gears each include a reduced diameter portion, the reduced diameter portion of the first sun gear clearing each of the second planet gears of the second set of planet gears, and the reduced diameter portion of the second sun gear clearing each of the first planet gears of the first set of planet gears.

12. The planetary differential gear set of claim 1, wherein the ring gear defines first and second circumferential recesses respectively at the first and second axial sides, wherein the first and the second carrier housing pieces include respective perimeter flanges that fit within the first and second circumferential recesses, respectively.

13. The planetary differential gear set of claim 12, wherein the perimeter flanges of the first and the second carrier housing pieces are circular and the first and the second circumferential recesses are circular.

14. The planetary differential gear set of claim 13, wherein the first and the second carrier housing pieces have main bodies that project axially from the perimeter flanges, the main bodies having perimeters with undulating shapes.

15. A planetary differential gear set comprising:
a first sun gear;
a second sun gear coaxially aligned with the first sun gear;
a first set of pins;
a first set of planet gears rotatably mounted on the first set of pins and meshed with the first sun gear;
a second set of pins;
a second set of planet gears rotatably mounted on the second set of pins and meshed with the second sun gear;
a plurality of intermeshing planet gear pairs, each of the intermeshing planet gear pairs including a first planet gear of the first set of planet gears and a second planet gear of the second set of planet gears, the planet gears of the first and second sets of planet gears each including a first axial section having gear teeth and a second axial section not having gear teeth;
a ring gear; and
a carrier that substantially encloses the first sun gear, the second sun gear, the first set of planet gears, and the second set of planet gears, the carrier including first and second carrier housing pieces that respectively define first and second opposite major axial sides of the carrier, the first and second carrier housing pieces each defining a central opening in co-axial alignment with the first and second sun gears, the first and second carrier housing pieces including outer bearing-mount sleeves that surround the central openings, the ring gear being co-axially aligned with the first and second sun gears and being mounted between the first and second carrier housing pieces such that the ring gear maintains a fixed axial spacing between the first and second carrier housing pieces, the first carrier housing piece being secured at a first axial side of the ring gear by a first perimeter weld between the ring gear and the first carrier housing piece, the second carrier housing piece being secured at a second axial side of the ring gear by a second perimeter weld between the ring gear and the second carrier housing piece, the first and second carrier housing pieces each including a first set of pin holes and a second set of pin holes, the first set of pin holes mounting the first set of pins, and the second set of pin holes mounting the second set of pins;

wherein the first sun gear, the second sun gear, the first set of planet gears, and the second set of planet gears are permanently enclosed by the carrier and thereby are not removable from the carrier;

wherein the ring gear includes a first cylindrical surface portion and a second cylindrical surface portion concentric with the first cylindrical surface portion;

wherein the first carrier housing piece of the carrier includes a first cylindrical surface and the second carrier housing piece of the carrier includes a second cylindrical surface;

wherein the first carrier housing piece of the carrier is located with respect to the ring gear by engagement of the first cylindrical surface portion and the first cylindrical surface; and wherein the second carrier housing piece of the carrier is located with respect to the ring gear by engagement of the second cylindrical surface portion and the second cylindrical surface.

16. The planetary differential gear set of claim 15, wherein the first sun gear is adapted to drive a first axle of an automobile and the second sun gear is adapted to drive a second axle of the automobile.

17. The planetary differential gear set of claim 15, wherein the first sun gear is adapted to drive a first drive shaft of a vehicle and the second sun gear is adapted to drive a second drive shaft of the vehicle.

18. The planetary differential gear set of claim 15, wherein the first set of planet gears and the second set of planet gears are positioned about the sun gears at a common radius.

19. The planetary differential gear set of claim 15, wherein:
the second sun gear and the first sun gear are interchangeable parts with each other;
the planet gears of the first set and the second set of planet gears are interchangeable with each other; and
the first carrier housing piece and the second carrier housing piece of the carrier are interchangeable with each other.

20. The planetary differential gear set of claim 15, further comprising:
at least four of the intermeshing planet gear pairs;
wherein the ring gear defines an innermost surface, the innermost surface of the ring gear positioned beyond an outermost cylinder occupied by the intermeshing planet gear pairs.

21. The planetary differential gear set of claim 20, wherein the innermost surface of the ring gear defines a radius spaced from the outermost cylinder occupied by the intermeshing planet gear pairs by a radial distance that is less than a thickness of a tooth of the gear teeth of the first axial section of the planet gears.

22. The planetary differential gear set of claim 15, wherein the first and second carrier housing pieces of the carrier respectively include a first wall and a second wall that are spaced from each other, wherein the first and the second planet gear of the plurality of intermeshing planet gear pairs each substantially extend between the first wall and the second wall.

23. The planetary differential gear set of claim 22, wherein the first sun gear substantially extends between the first wall and the second sun gear and wherein the second sun gear substantially extends between the first sun gear and the second wall.

24. The planetary differential gear set of claim 15, wherein the second axial section of the planet gears each include a reduced diameter portion, the reduced diameter portion of the first planet gear clearing the second sun gear and the reduced diameter portion of the second planet gear clearing the first sun gear.

25. The planetary differential gear set of claim 15, wherein the ring gear includes a first stop and a second stop spaced from the first stop by a distance corresponding to the fixed axial spacing between the first and second carrier housing pieces and wherein the first carrier housing piece of the carrier abuts the first stop and the second carrier housing piece of the carrier abuts the second stop thereby spacing the first carrier housing piece from the second carrier housing piece by the distance.

26. The planetary differential gear set of claim 15, wherein the first and the second sun gears each include a reduced diameter portion, the reduced diameter portion of the first sun gear clearing each of the second planet gears of the second set of planet gears, and the reduced diameter portion of the second sun gear clearing each of the first planet gears of the first set of planet gears.

27. The planetary differential gear set of claim 15, wherein the ring gear defines first and second circumferential recesses respectively at the first and second axial sides, wherein the first and the second carrier housing pieces include respective perimeter flanges that fit within the first and second circumferential recesses, respectively.

28. The planetary differential gear set of claim 27, wherein the perimeter flanges of the first and the second carrier housing pieces are circular and the first and the second circumferential recesses are circular.

29. The planetary differential gear set of claim 28, wherein the first and the second carrier housing pieces have main bodies that project axially from the perimeter flanges, the main bodies having perimeters with undulating shapes.

30. A planetary differential gear set comprising:
a first sun gear;
a second sun gear coaxially aligned with the first sun gear;
a first set of pins;
a first set of planet gears rotatably mounted on the first set of pins and meshed with the first sun gear;
a second set of pins;
a second set of planet gears rotatably mounted on the second set of pins and meshed with the second sun gear;
a plurality of intermeshing planet gear pairs, each of the intermeshing planet gear pairs including a first planet gear of the first set of planet gears and a second planet gear of the second set of planet gears, the planet gears of the first and second sets of planet gears each including a first axial section having gear teeth and a second axial section not having gear teeth;
a ring gear; and
a carrier that substantially encloses the first sun gear, the second sun gear, the first set of planet gears, and the second set of planet gears, the carrier including first and second carrier housing pieces that respectively define first and second opposite major axial sides of the carrier, the first and second carrier housing pieces each defining a central opening in co-axial alignment with the first and second sun gears, the first and second carrier housing pieces including outer bearing-mount sleeves that surround the central openings, the ring gear being co-axially aligned with the first and second sun gears and being mounted between the first and second carrier housing pieces such that the ring gear maintains a fixed axial spacing between the first and second carrier housing pieces, the first carrier housing piece being secured at a first axial side of the ring gear by a first perimeter weld between the ring gear and the first carrier housing piece, the second carrier housing piece being secured at a second axial side of the ring gear by a second perimeter weld between the ring gear and the second carrier housing piece, the first and second carrier housing pieces each including a first set of pin holes and a second set of pin holes, the first set of pin holes mounting the first set of pins, and the second set of pin holes mounting the second set of pins;

wherein the first sun gear, the second sun gear, the first set of planet gears, and the second set of planet gears are permanently enclosed by the carrier and thereby are not removable from the carrier;

wherein the ring gear defines first and second circumferential recesses respectively at the first and second axial sides; and wherein the first and the second carrier housing pieces include respective perimeter flanges that fit within the first and second circumferential recesses, respectively.

31. The planetary differential gear set of claim 30, wherein the first sun gear is adapted to drive a first axle of an automobile and the second sun gear is adapted to drive a second axle of the automobile.

32. The planetary differential gear set of claim 30, wherein the first sun gear is adapted to drive a first drive shaft of a vehicle and the second sun gear is adapted to drive a second drive shaft of the vehicle.

33. The planetary differential gear set of claim 30, wherein the first set of planet gears and the second set of planet gears are positioned about the sun gears at a common radius.

34. The planetary differential gear set of claim 30, further comprising:

at least four of the intermeshing planet gear pairs;

wherein the ring gear defines an innermost surface, the innermost surface of the ring gear positioned beyond an outermost cylinder occupied by the intermeshing planet gear pairs.

35. The planetary differential gear set of claim 34, wherein the innermost surface of the ring gear defines a radius spaced from the outermost cylinder occupied by the intermeshing planet gear pairs by a radial distance that is less than a thickness of a tooth of the gear teeth of the first axial section of the planet gears.

36. The planetary differential gear set of claim 30, wherein the first and second carrier housing pieces of the carrier respectively include a first wall and a second wall that are spaced from each other, wherein the first and the second planet gear of the plurality of intermeshing planet gear pairs each substantially extend between the first wall and the second wall.

37. The planetary differential gear set of claim 36, wherein the first sun gear substantially extends between the first wall and the second sun gear and wherein the second sun gear substantially extends between the first sun gear and the second wall.

38. The planetary differential gear set of claim 30, wherein the second axial section of the planet gears each include a reduced diameter portion, the reduced diameter portion of the first planet gear clearing the second sun gear and the reduced diameter portion of the second planet gear clearing the first sun gear.

39. The planetary differential gear set of claim 30, wherein the ring gear includes a first stop and a second stop spaced from the first stop by a distance corresponding to the fixed axial spacing between the first and second carrier housing pieces and wherein the first carrier housing piece of the carrier abuts the first stop and the second carrier housing piece of the carrier abuts the second stop thereby spacing the first carrier housing piece from the second carrier housing piece by the distance.

40. The planetary differential gear set of claim 30, wherein the first and the second sun gears each include a reduced diameter portion, the reduced diameter portion of the first sun gear clearing each of the second planet gears of the second set of planet gears, and the reduced diameter portion of the second sun gear clearing each of the first planet gears of the first set of planet gears.

41. The planetary differential gear set of claim 30, wherein the perimeter flanges of the first and the second carrier housing pieces are circular and the first and the second circumferential recesses are circular.

42. The planetary differential gear set of claim 41, wherein the first and the second carrier housing pieces have main bodies that project axially from the perimeter flanges, the main bodies having perimeters with undulating shapes.

* * * * *